(12) United States Patent
Hope et al.

(10) Patent No.: US 7,660,649 B1
(45) Date of Patent: Feb. 9, 2010

(54) RESOURCE MANAGEMENT USING CALCULATED SENSITIVITIES

(75) Inventors: Gordon Hope, Elko (CA); Adery C. A. Hope, legal representative, Elko (CA); Soorya Kuloor, Calgary (CA)

(73) Assignee: Optimal Innovations Inc., Bridgetown (BB)

( * ) Notice: Subject to any disclaimer, the term of this patent is extended or adjusted under 35 U.S.C. 154(b) by 290 days.

(21) Appl. No.: 11/175,980

(22) Filed: Jul. 5, 2005

Related U.S. Application Data

(60) Provisional application No. 60/585,558, filed on Jul. 2, 2004, provisional application No. 60/585,559, filed on Jul. 2, 2004.

(51) Int. Cl.
*G05B 13/02* (2006.01)

(52) U.S. Cl. .......................... 700/295; 700/28
(58) Field of Classification Search .................. 700/28, 700/52, 99, 173, 295
See application file for complete search history.

(56) References Cited

U.S. PATENT DOCUMENTS

| | | | |
|---|---|---|---|
| 4,023,139 A | 5/1977 | Samburg | |
| 4,090,248 A | 5/1978 | Swanson et al. | |
| 4,168,491 A | 9/1979 | Phillips et al. | |
| 4,212,078 A | 7/1980 | Games et al. | |
| 4,298,860 A | 11/1981 | Norberg et al. | |
| 4,419,667 A | 12/1983 | Gurr et al. | |
| 5,870,032 A | 2/1999 | Eslambolchi | |
| 6,021,402 A * | 2/2000 | Takriti | 705/412 |
| 6,058,479 A | 5/2000 | Sorhaug et al. | |
| 6,134,226 A * | 10/2000 | Reed et al. | 370/328 |
| 6,516,352 B1 | 2/2003 | Booth et al. | |
| 6,633,823 B2 | 10/2003 | Bartone et al. | |
| 6,745,088 B2 * | 6/2004 | Gagne | 700/29 |
| 6,748,279 B2 * | 6/2004 | Bennett | 700/28 |
| 2002/0011923 A1 | 1/2002 | Cunningham et al. | |
| 2002/0033416 A1 | 3/2002 | Gerszberg et al. | |
| 2002/0075814 A1 | 6/2002 | Desai et al. | |
| 2003/0044050 A1 | 3/2003 | Clark et al. | |

FOREIGN PATENT DOCUMENTS

EP   1471705   10/2004

OTHER PUBLICATIONS

Preedavichit, P. And Srivastava, S.C. "Optimal Reactive Power Dispatch Considering Facts Devices". Proceeding of the 4th International Conference on Advances in Power System Control, Operation and Management (1997): 620-625.*

H W Dommel and W.F. Tinney, "Optimal Power Flow Solutions". IEEE Transactions on Power Apparatus and Systems vol. PAS-87, No. 10 (Oct. 1968):1866-1876.*

(Continued)

*Primary Examiner*—Ryan A Jarrett
(74) *Attorney, Agent, or Firm*—Kilpatrick Stockton LLP

(57) ABSTRACT

The present invention is directed to a system and method which includes a new optimization algorithm that not only optimizes the given system but provides sensitivity factors that provide the effect of changes in the system and how the changes are going to affect the overall performance of the system.

43 Claims, 5 Drawing Sheets

OTHER PUBLICATIONS

A.J. Conejo, E. Castillo, R. Minguez, and F. Milano. "Locational Marginal Price Sensitivities". IEEE Transaction on Power Systems vol. 20, No. 4 (Nov. 2005): 2026-2033.*

U.S. Appl. No. 60/585,557, filed Jul. 2, 2004, Schoettle.

U.S. Appl. No. 60/591,265, filed Jul. 26, 2004, Schoettle.

International Search Report & Written Opinion issued for PCT/IB2005/003048 Mar. 14, 2006.

International Search Report & Written Opinion issued for PCT/IB2005/004168 Nov. 27, 2006.

Keller, L., "Micromanaging Loads for Optimal Grid Performance," EIC Currents (Newsletter of the E-Source Energy Information & Communication Service), Sep. 2003, pp. 1-5, Platts Research & Consulting.

Evans, Peter B., "Draft PIER Consultant Report: Optimal Portfolio Methodology for Assessing Distributed Energy Resources Benefits for the Energynet," Prepared for California Energy Commission Public Interest Energy Research Program, Apr. 2005.

Declaration of Richard Hammond, Dec. 20, 2007.

Declaration of Roland Schoettle, Dec. 20, 2007.

"Upcoming Events", Optimal Technologies, Inc., Apr. 24, 2008, http://www.otii.com/events.htm, 7 pp.

DER Policy Symposium Announcement, CADER (California Alliance for Distributed Energy Resources), Jan. 30-Feb. 1, 2008, pp. 1-6.

* cited by examiner

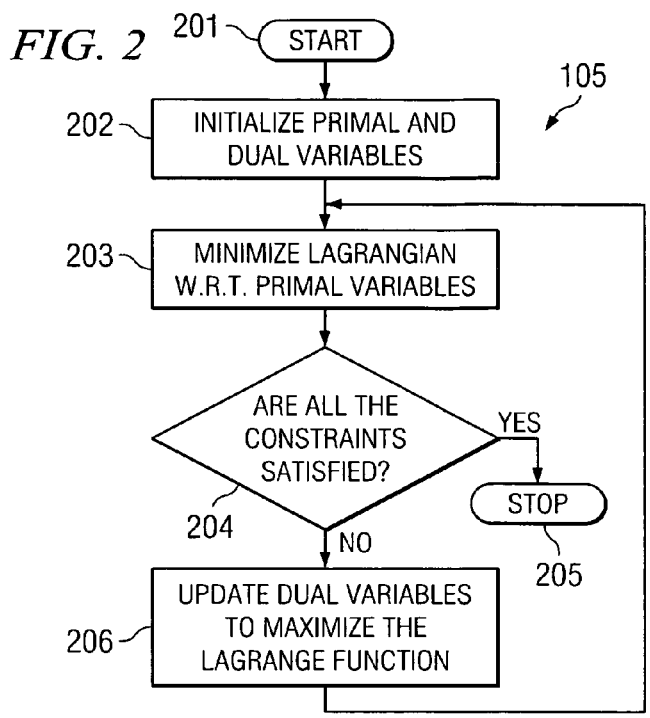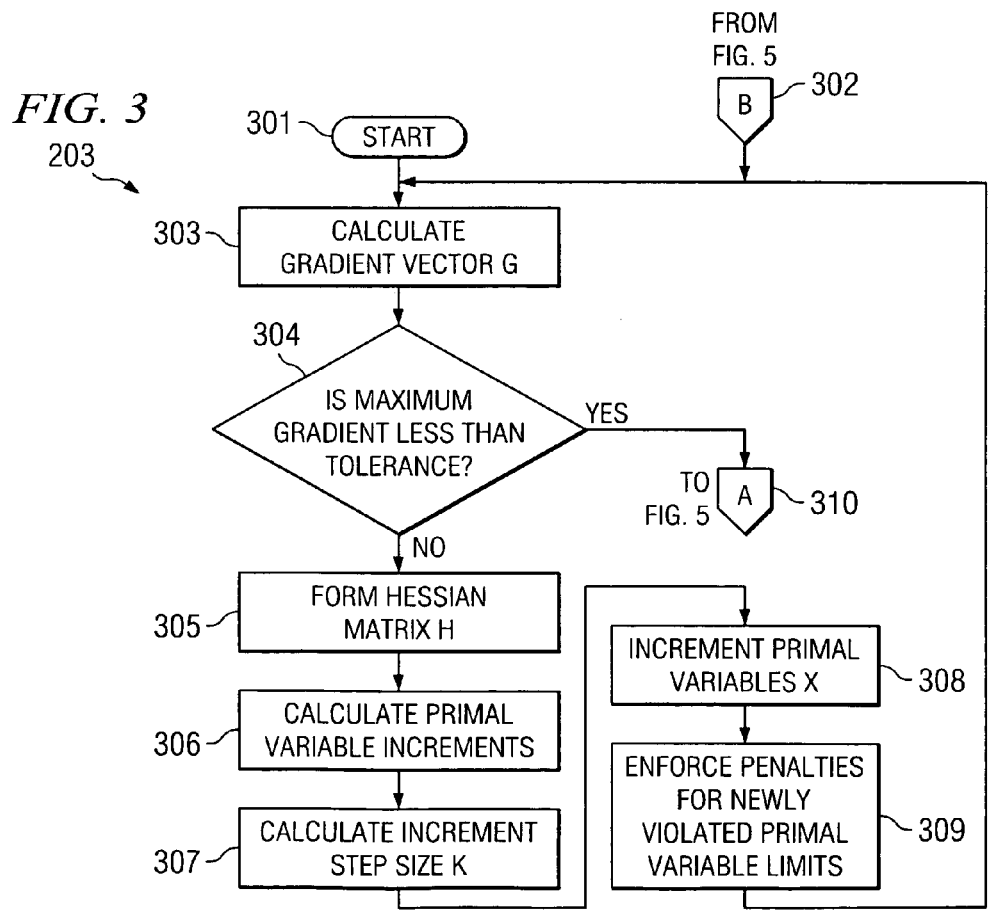

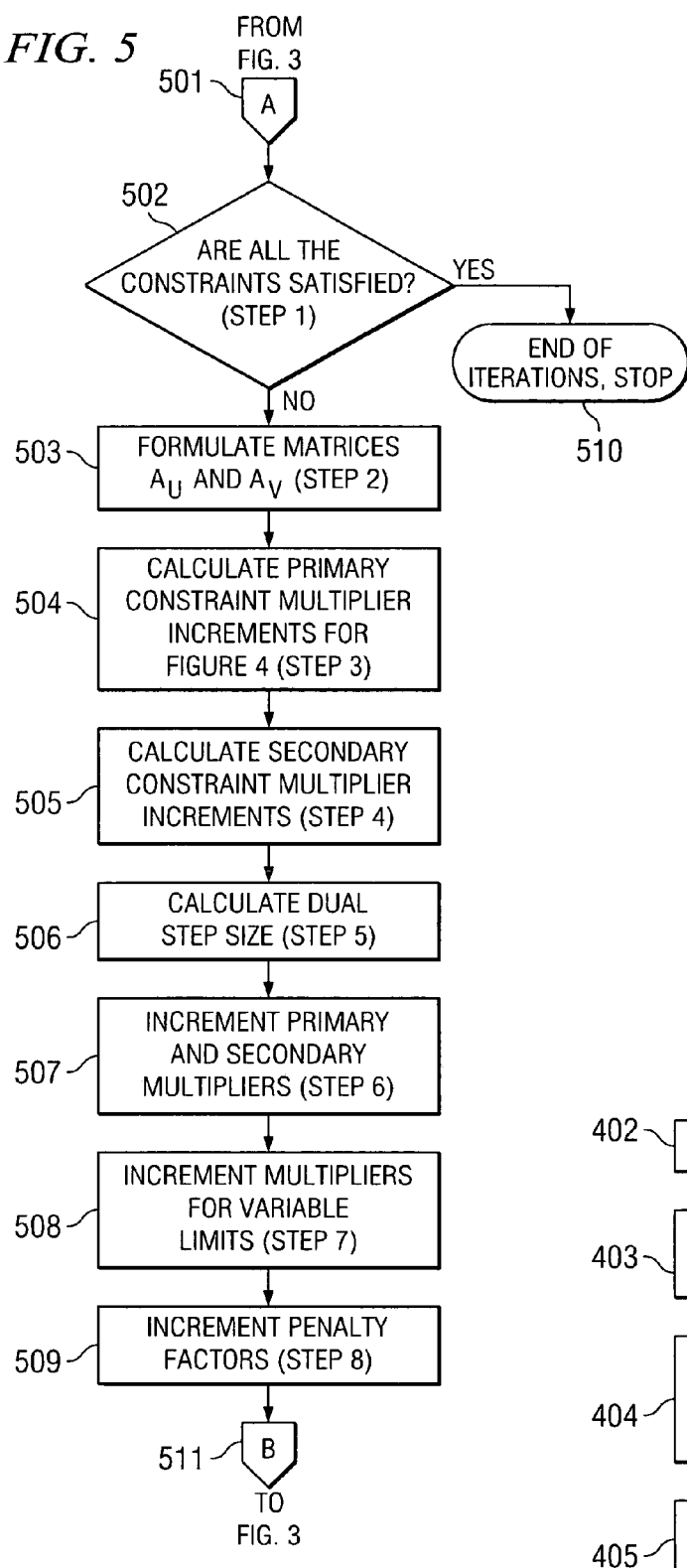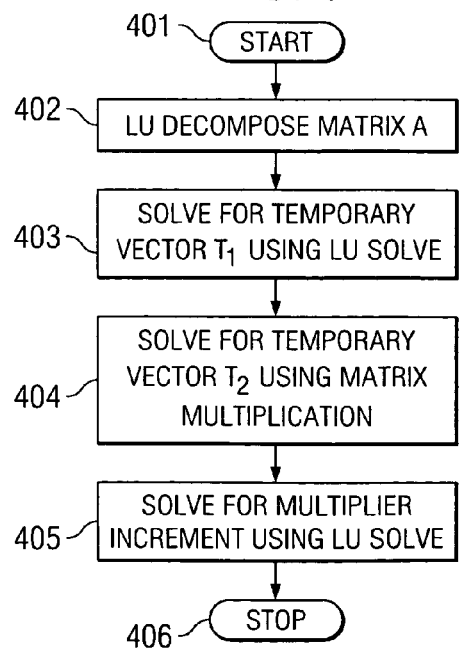

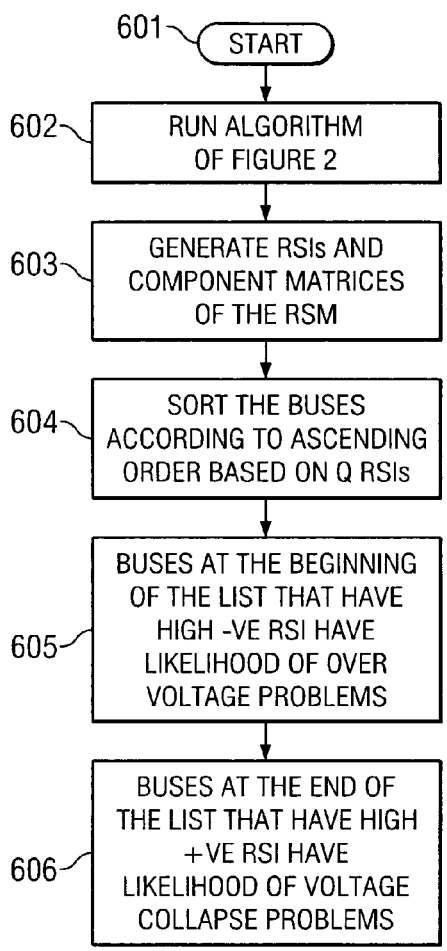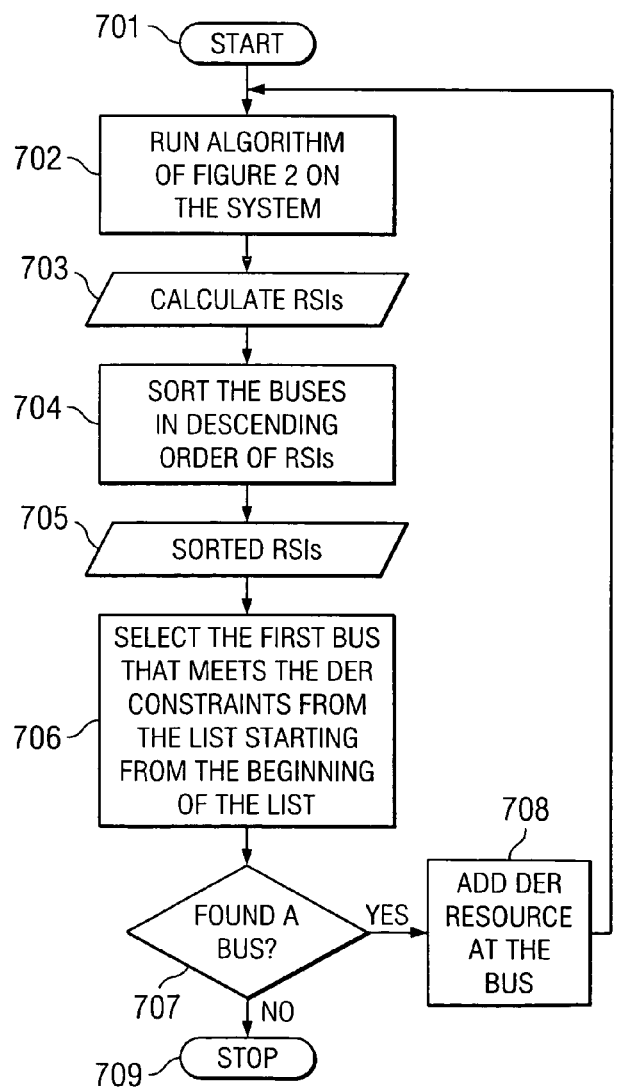

RESOURCE MANAGEMENT USING CALCULATED SENSITIVITIES

CROSS-REFERENCE TO RELATED APPLICATIONS

This application claims priority benefit of U.S. Provisional Patent Application Nos. 60/585,558 entitled "A WAY TO CALCULATE AND USE THE SENSITIVITIES OF VARIOUS RESOURCES IN A POWER SYSTEM TO A GIVEN OBJECTIVE," filed Jul. 2, 2004, the disclosure of which is hereby incorporated herein by reference, and 60/585,559 entitled "A WAY TO CALCULATE AND USE THE SENSITIVITIES OF VARIOUS RESOURCES IN A POWER SYSTEM TO A GIVEN OBJECTIVE," filed Jul. 2, 2004, the disclosure of which is hereby incorporated herein by reference. This application is related to currently filed and commonly assigned U.S. patent application Ser. No. 11/172,615 entitled "SYSTEM AND METHOD FOR DELIVERY AND MANAGEMENT OF END-USER SERVICES," filed Jun. 30, 2005, and U.S. patent application Ser. No. 11/172,392 entitled "MEDIUM TO DISPARATE MEDIUM HOPPING MESH NETWORK," filed Jun. 30, 2005, the disclosures of which are hereby incorporated herein by reference.

TECHNICAL FIELD

This application relates in general to resource optimization, and with specific embodiments of managing resources in a power network.

BACKGROUND OF THE INVENTION

Large-scale analysis and optimization of non-linear networks is among the most difficult of system analytic problems. "Non-linear" means an input to a network does not result in output from the network that is proportional to the input. Traditionally, linear programming and nonlinear programming methods have been used to solve network optimization problems. Due to their mathematical limitations, however, each of these methods typically is applied to network problems that first are simplified and/or reduced in scale compared to the problem that exists in the actual network. Often, the network problems that are to be analyzed are framed with objectives more limited in number and/or complexity than the multiple objectives that typically exist for network design and operation. In today's complex, high-speed, high-growth and deregulated world, the number of planning and operational goals for networks generally (networks, for example, for electric power generation, transmission, distribution, and use; telecommunications; data generation, transmission, and use; transportation; and shipping, among innumerable other types of networks) has increased considerably. The traditional network optimization approaches are increasingly unequal to the challenges. In general, there are some approaches to solving complex network problems.

A common approach to network analysis and optimization simplifies the optimization problem with a number of assumptions, and hence reduces complexity. One approach uses a piece-wise linear simplification. However, in the context of complex network optimization, most (if not all) objectives are nonlinear problems. A linear method cannot produce accurate solutions because the loss objective cannot be piece-wise linearized accurately. A power system, for example, needs to be optimized to meet a number of conflicting simultaneous objectives, but traditional methods cannot handle multiple objectives. This limitation necessitates application of a multitude of programs to solve a number of similar problems whose solutions really should work in close conjunction with one another. Simplified approaches lead to fast but inflexible, inaccurate, and limited solutions.

Another approach typically recognizes that non-linear networks often are best addressed for analytical and optimization purposes with non-linear mathematics, involving non-linear equations. Special methods are needed to solve nonlinear equations. Current non-linear approaches, however, typically map the original large network problem into another domain where the problem size is considerably smaller than the original, then uses non-linear programming methods capable only of running a problem of that reduced scale. These non-linear programming methods typically use penalty functions to enforce "inequality" constraints. Specifically, system "constraints" that are expressed as "limits" and that fluctuate dynamically within a permissible range in a functioning network system. In effect, these programming methods attempt to draw conclusions that oversimplify the complex relationships within the problem. The penalty factors increment at each iteration of the solution, with the final values being close to infinity, resulting in distorted "problem space" and hence ill-conditioning of the mathematical matrix model. In another such example, in power transmission optimization, the "Dual Augmented Lagrangian Approach for Optimal Power Flow" method does not maintain the sparsity structure of the incidence matrix. This results in large runtimes. Such methods also lack a proper technique to determine infeasible cases. These oversimplifying methods tend to produce approximate solutions to complex optimization problems, where the significance of the approximation inaccuracy has significant incremental and cumulative dysfunction/cost implications.

Electric power systems are examples of large highly non-linear networks. They must be planned and managed to meet system operating constraints under both major and minor changes in network generation, transmission, and distribution system resources, and to meet changing network consumer demand. When power system operators and designers make adjustments to the network power system, they must address multiple concerns. For example, they require a solution that is relatively inexpensive to implement, will not hinder or threaten the performance of the existing network, and is robust. This is an ongoing, expensive task, where poorly understood, ill-planned adjustments result in millions of dollars in revenue loss, diminished power quality, increased congestion and system losses, increased equipment damage, and increased liability.

The U.S. electric system includes over 6,000 generating units, more than 800,000 kilometers of bulk transmission lines, approximately 12,000 major transmission substations, and innumerable lower-voltage distribution transformers. This enormous network is controlled regionally by more than one hundred (100) separate control centers that coordinate responsibilities jointly for the impacts upon real-time network operations. A control center coordinates the operation of bulk power system components and is responsible for operating the power system within a geographic region called a control area. One or more utilities make up a control area. A control center is connected to other control centers with transmission interconnection (tie) lines. Through communications (metering and telemetry), the control center is constantly informed of generating plant output and the system condition of transmission lines, substations (including load demand at each substation), and ties to neighboring systems. A control center uses this information in attempting to optimize power flow across the grid during operations, while simultaneously ensuring reliability and interchange scheduling with other control centers. However, with dramatic increases in demand, even the most efficient transmission (and distribution) grid networks are running out of capacity, thus increasing requirements for improved optimization during network operations and in planning for system upgrades and new system facilities.

As electric power deregulation and market system development efforts continue, and as the number of power transactions increases, new power demand growth and supply requirements are pushing transmission and distribution systems to their limits. These T&D networks cannot be improved to meet new requirements at the rate or with the effectiveness needed to keep pace with new pressures on them. This has resulted in more volatile generation dispatch patterns, increased congestion, reduced operating margins, and significant challenges to system reliability. Increasing requirements of industry and commerce dependent on high-quality power supply are expected to accelerate this trend. The need is increasingly critical to optimize the functions and use of electric power systems, through increased accuracy and greater productivity in system planning and operation.

BRIEF SUMMARY OF THE INVENTION

Embodiments of the present invention are directed to a system and method which includes a new optimization algorithm driving a software program that not only optimizes the subject network or system for multiple simultaneous objectives, but also can report out sensitivity factors, which express the magnitude and direction from ideal. These factors represent the effects of changes in the network at every point of the network, indicate the effects of the changes, and indicate the overall performance of the network.

Two types of sensitivities may be provided. The first is the sensitivity of a given objective function with respect to changes in resources at various parts of the system. The second is an index showing the way in which the sensitivities themselves change with respect to the changes in resources. This allows detailed determination of where in a network to add, subtract, substitute, reduce, relocate, or otherwise change network resources, conditions, and/or operations. Embodiments of the invention may use PC-scale computer technologies and work in either planning or real-time operating time frames.

Embodiments of the present invention involve a new algorithm and software application system which provide a method of analyzing and optimizing complex nonlinear problems. Embodiments of the invention may not be a single, stand-alone product, but rather may be an open and scalable technology designed specifically to be the core network optimization and analysis algorithm and software "engine" or a new software tool. Embodiments of the invention may be useable with a host of potential large-scale network analysis and optimization applications. Embodiments of the invention may express a distributed, open architecture that encourages modification and/or addition of objectives, subsystems, and agents. The open architecture may also provide added adaptability for a variety of database interfaces.

Embodiments of the present invention may be based on a non-linear "Quasi-Newtonian" approach that uses a detailed non-linear problem definition with accurately reflecting system variables, system constraints, and defined network operating objectives, which can be ranked by priority. It employs a primal-dual method with a new multiplier "prediction" technique that promotes fast convergence and that enables it accurately to determine, among other network solutions, optimal locations for system resource additions or operating changes based on optimization of the network for any combination and/or ranking of network operating objectives. Matrices may be used by embodiments of the present invention for prediction. Matrices may also have the size and sparsity of Newtonian matrices. Embodiments of the present invention employ new techniques to prevent ill-conditioning of matrices. It enforces multiple objectives and inequality constraints. It combines linear, nonlinear and heuristic techniques to meet flexibility requirements in the analysis.

Embodiments of the present invention may run as a single unique process, with each network objective mathematically aware of the constraint limits imposed by other identified objectives. The problem solutions of the embodiments of the invention may accurately represent the subject network as it actually exists, rather than a simplification or reduction of it, or a segmentation of it. Its system and method may enable its application to accurate, detailed models of very large networks, with each optimization run accomplished on a PC-type computer in run-times measured in seconds or fractions of a second. The system and method may be starting point independent, meaning that it can begin its analysis and optimization at any point of the network and repeatedly find the best global solution. When the problem requires, embodiments of the present invention may also allow for segmentation or "regioning" of a network, allowing analysis of local optimal solutions within a global optimum.

Embodiments of the present invention may tightly and simultaneously link optimization of the subject network with (a) comprehensive measurement of system resources, and/or (b) the amount of mathematical "stress" placed on each node of the network in meeting network-wide constraints, such that the sensitivity indices generated by the matrices are used to index and rank resources and conditions at all individual nodes on the network with respect to their relative sensitivity to the network objectives specified under each optimization scenario.

Internally, embodiments of the invention may maintain a complex sensitivity matrix (CSM). The CSM may be used to obtain significant information about the system being analyzed. Any network change that forces each network component toward its ideal value is "beneficial", while a change that forces the network component away from the ideal value is "undesirable". This information may be used to generate at least two sets of sensitivity indices: (1) System Resource Sensitivity Indices ("RSI"), which are obtained using the deviation of the network component mathematical value from its ideal mathematical value; and (2) System Resource Sensitivity Matrix ("RSM"), which gives the sensitivities of the RSIs themselves to changes in the resources.

The multiplier predictive and fast convergence capabilities of embodiments of the present invention, together with the RSIs and RSM, provide information enabling the user to identify the most promising potential changes to the network for further optimization of the network consistent with service of the objectives. Embodiments of the present invention may use this information to identify where added resources can improve network performance, ranked in terms of relative value of each potential resource increment, taking into account the changes to the network resulting from each individual addition. It may sequentially incorporate the most valuable of them, and re-optimizes the network to identify a new set of potential additions, until incremental network performance improvement reaches a point of diminishing returns. Using this method, the software tool can consider and distinguish among precise locations and size of potential additions of all types of network resources, with minimal and efficient direction from network engineers. The RSIs and RSM thus are useful both in network optimization planning scenarios and in generating alternative control action scenarios for "real-time" use in network operations.

One embodiment of the invention may automate the process of identifying, ranking, and selecting preferred incremental network changes, implementing such suggested changes in the network model, re-running the model to re-optimize the network, and repeating these steps until a preferred network solution is identified.

In any given network system, especially a system under stress, it may not be possible to satisfy all constraints, resulting in various network problems. Despite the inability to satisfy all network constraints, a system solution nevertheless must be found that determines and maintains system security. Embodiments of the present invention may detect the potential for infeasibility by monitoring the amount and type of "mathematical push" that is required at network nodes to meet system constraints and objectives, which is an indication of the binding strength of the constraints, where abnormal values indicate infeasibility. The software tool may publish to the user a list of network nodes with infeasible values or whose values show trends toward infeasibility, indicating nodes at which those values must be relaxed and nodes at which constraints interfere with the optimization objectives. The method is able to quickly identify solutions that meet hard networks constraints by preferentially relaxing (minimally violating) and maintaining a minimum number of "soft" network constraints identified by the method as causing the least adverse effect on network performance objectives.

The embodiments of the present invention optimize the given network problem and generates the final schedule, and the required indices and provides them to upper layers. The optimization kernel may incorporate optimization and sparse matrix methodologies.

Mathematically the kernel may run as a singular process. The mathematical components of the process, may not run in isolation and are directly exposed to other components, their limits, boundary conditions and inter-relationships. In this context, objective functions may be readily added, changed, or updated independently to define a new kernel that will have new application layers. The embodiments of the present invention are highly customizable and are applicable to many different complex network optimization problems.

The Application Layer may provide the operational and planning applications to which the kernel is applied. Applications may directly interact with the optimization kernel below and with the security layer above. The optimization kernel may have direct access to the application, which speeds the calculations and gives a path for information from the optimization process to be directly utilized by the application.

The Security Layer may provide a secure encrypted connection between the applications in the Application Layer below and the Interface Abstraction Layer above. This security function is desirable since the server and the user may be separated by local and wide area networks (e.g., the Internet and corporate Intranets).

Another embodiment of the invention, the Interface Abstraction Layer may be linked to a Graphical User Interface(s) in a client-server fashion using a local or wide area network. In various embodiments of the invention, user interfaces can be on separate computers or the same computer, facilitating the use of the tool from long distances and allowing many different users to have customized access to particular objectives within the same run. In such embodiments, the client may load the data and provide it to the server using the network connection, and the server may optimize the system and return the optimized schedules and the indices to the client. In this embodiment, multi-user locking via permission (security) levels may be used in the event of conflicting input.

Embodiments of the invention may be implemented using the C++ programming language and may be used with different versions of UNIX and/or Windows operating systems and on a number of hardware platforms.

Embodiments of the invention may identify a preferred starting point for network optimizations using a point defined by the initial values of voltages and Lagrange multipliers. Selection of the starting point affects the scale of mathematical challenge posed by the optimization problem and therefore the speed of the optimization and network convergence. Regardless of the starting point, however, the embodiments may arrive at the same precise solution, which therefore is established as a "starting point independent".

The method may use one of two types of starting points: (1) A "flat start", in which network nodal values are initialized to the same ("flat"), values. Since real networks typically are far from ideal in design and/or operation, the first iterations using embodiments of present invention are computationally intensive. The "flat start" is also called a "cold start". (2) A "hot start", which uses network nodal values produced by a previously solved optimization for the subject network using the same objectives under similar network use conditions. If the previous network "case" is close to the case being optimized, the "hot start" method provides the fastest convergence. In an embodiment of the present invention developed for real-time operation of networks, the hot start approach is well suited for tracking network control as the software tool continuously improves its convergence speed.

Embodiments of present invention support preferential zones so the designer/operator user can "de-rate" the contribution of resources to the network from areas outside the controlled network. It recognizes zones where constraints are strictly enforced and zones where constraints can be relaxed. The user can de-rate the contribution of resources from areas of the network outside immediate control and/or in areas where data is lacking.

Embodiments of the present invention allow the user to assign different nodes in the subject network be given a different "hardness" according to practical considerations. This approach, which is another application of "preferential relaxation", also is useful when analysis is extended to include external or interconnected systems. In addition, rather than simply relaxing a control and accepting the result, the user can set up a graduated scale to control relaxation steps, allowing avoidance of very large violations.

Embodiments of the present invention involve its application to varied software programs designed specifically for use in optimizing electric power networks and electric-power network-based markets. These embodiments comprise an optimizing family of electric system analysis, power flow, and financial modeling products targeted at many aspects of the generation, transmission, distribution, and use of electric energy, and related electric energy markets. Embodiments may be used to solve a number of power system operational and planning problems.

Embodiments of the invention involving power systems and markets, data describing electric power transmission and distribution networks, system generation, system loads, constraint conditions, and network objectives are entered into the embodiment's model to formulate the optimization problem, and the software then is run to identify and rank the bus-specific (network node-specific) control measures and resource changes (including additions, subtractions, relocations, substitutions, among other possible changes) to meet criteria (objectives) specified by the system planner, system operator, or power market operator. In these embodiments, RSIs and the RSM may be used to indicate the quality of overall network performance and to measure and rank, for example, generators, VAr source devices, and other network resources, and loads, according their relative performance and condition in relation to specified network objectives. The indices may also be used to detect and relax infeasibilities, such as voltage limit infeasibility and/or tendency towards infeasibility.

A further embodiment of the power network embodiment can be applied to real-time operation and control of power transmission and/or distribution networks by transmission system control centers. In this embodiment, power grid control center operators can monitor, evaluate, analyze, optimize, control, and/or co-ordinate the generation, transmission, distribution, and use of electricity in a cost-effective manner. This embodiment may optimize a given power network to meet defined operational goals, and provide basic system optimization outputs as, for example, an optimum schedule of system control devices to meet the given goals. This embodiment may also provide locations where there is a surplus/deficit of active and reactive power, relative costs of supplying active and reactive power to any location in the system, and locations that are sensitive to active and reactive power changes in the system.

A further embodiment of the power network embodiment can be applied by transmission and distribution network designers and planners as a planning tool. In this embodiment, they can analyze and optimize paths, locations, size, and type of equipment for potential T&D network upgrades and resource additions, network bottlenecks and congestion, contingencies, contingency scenarios, and possible remedial response actions; and after-the-fact network studies, among numerous other design and planning applications.

Further embodiments of the power network embodiment can be applied by power market designers, planners, and economists as a market design and financial planning and analysis tool, and/or as a real-time market operations tool. Using these embodiments, they can quickly and accurately monitor, control, and co-ordinate various power network constraints and marginal pricing concerns. They can design power markets and market product offerings that accurately structure cost and price incentives and disincentives to influence decisions by market participants including, among diverse others, power producers and sellers, reserve capacity owners, power customer buyers, power users agreeing not to use power in peak periods, transmission network owners, and transmission network users.

In these embodiments, the user may choose any number of network objectives, which either may be simple objectives or a weighted (ranked) mix of multiple objectives. In these embodiments, all (or a portion of) power network or power market variables, parameters, and controls may be recorded, as are performance indices that describe the operating condition or performance of diverse components throughout the system. The electric power network and market embodiments allow individual or multiple simultaneous network objectives (multiple objectives used individually sequentially, or in ranked or unranked combination).

An objective of the power network and power market embodiments is minimization of system violations in, for example, voltages and transmission line flows, to improve network operating security. Changes in the power network due to load, generation and device status may introduce violations in voltages and transmission line flows. The power network voltage profile should be such that any disturbances in the system do not cause interruption in the power supply. The voltages should also be within the operating limits of connected devices such as circuit breakers. Any such violations should be corrected.

Another objective of the power network and power market embodiments is minimization of network active power generation. The minimum generation objective is the similar to the minimum transmission loss objective, but has a different mathematical formulation. An additional related available objective in these embodiments is minimum total cost of active power generation. The total cost of generation is the sum of the individual generation costs of each generator that is on-line. The generator cost curves are represented as piecewise linear cost curves or as smooth quadratic, cubic equations. This objective is used for economic consideration.

Another objective of the power network and power market embodiments is minimization of reactive power generation (generation of VArs). VAr minimization is used to reduce excessive VAr flows in the power network. Excessive VAr flows overload the transmission lines and also result in excessive power loss. This objective also reduces circulating VAr flows. An additional related objective in these embodiments is minimization of system VAr generation costs. In the past, reactive power (VAr) generation cost was negligible. However, with deregulation, the generation companies charge for reactive power. The Minimum VAr objective is used to minimize the cost of VAr purchased from the generating companies. An additional related available objective in these embodiments is minimization of system VAr loss. This objective is analogous to minimum transmission loss. Here the reactive power loss is minimized. This objective also results in a good voltage profile in the system. However, VAr loss is minimized using only reactive power controls. Active power controls are ineffective with this objective.

Another objective of the power network and power market embodiments is optimum placement of VAr resources. Placement of additional VAr resources typically has been viewed only as a network planning problem, and the planning tool embodiments of the present invention indeed can be so applied. Increasingly, however, real-time power network operations are understood to be sensitive to re-dispatch of controllable network VAr resources. It is expected that power markets will be structured to encourage optimal distribution of VAr resources in power networks by allowing sale of them into power markets at prices set to reflect their value, if any, at given locations. The power network and power market embodiments can be applied to these real-time network and market operations. During VAr placement, new VAr sources are placed at most effective locations to improve the system voltage profile. There are two main considerations during VAr placement. The first is to obtain the required voltage profile and the second is to maintain the cost of replacement as low as possible. Transmission line flows must be maintained below their limits all the times. The RSI and the RSM of these embodiments allow indication of most sensitive and/or most effective buses for VAr placement.

Another objective of the power network and power market embodiments is minimization of transmission losses. Using this objective, the active power lost in transmission lines is minimized. Minimizing transmission line loss also results in an improved voltage profile throughout the power system. This minimization can be done by scheduling only reactive power controls (voltage optimization), only active power controls (reactive power optimization), or both active and reactive power controls.

Another objective of the power network and power market embodiments is minimization of the number of network control device operations. In practice, it is impossible to schedule a large number of control devices within a short time. Under many circumstances frequent small changes in many of the control devices is discouraged, to prevent wear and tear. Therefore, in practice, only a reasonable number of most effective control devices should be scheduled. This is achieved using the minimum number of control actions objective.

Another objective of the power network and power market embodiments is minimization of deviation from an operating point. In this objective, available network controls are scheduled such that the deviation of designated network operating conditions or parameters from a specified operating point is minimized. This objective necessarily is combined with multiple other network objectives. The weighted sum of the squares of the deviations of controls from a specified network operating point is the objective to be minimized. The relative weights of the control devices in a power system are typically not well defined and therefore this objective must be used very carefully. This objective is generally used for corrective rescheduling of network resources.

Another objective of the power network and power market embodiments is minimization of fossil fuel generator emissions. Fossil fuel fired generating units have environmental impact on surrounding areas due to $SO_2$ and $NO_x$ emission, and on global warming due to $CO_2$ emissions. Therefore it is important to optimize the power system operation to reduce the emission of harmful gases. Minimum emission optimization is usually not economical and minimum cost optimization is usually emissive. A trade-off between these objectives is obtained for best results. Increasingly, state, national, and international regulatory and policy initiatives seek to limit emissions from power generation. Such initiatives include, among others, new regulatory requirements, emissions credit banks, emissions reduction markets. Using the minimum emissions objective and numerous of the other network optimization objectives incorporated in these embodiments, a user can plan, structure, implement, and document comprehensive network operations management programs allowing reduction of emissions.

Further embodiments of the electric power network and market embodiments support identification of locations in a power network at which load reduction will have optimal value toward meeting other specified network objectives, priority deployment of energy efficiency incentive programs, appliances, and devices in such areas. The embodiments also support deployment of programs and devices that allow direct management of neighborhood loads, campus and/or building loads, building system loads, industrial and commercial system loads, industrial and commercial machine and device loads, industrial and commercial appliance loads, and residential building system, appliance, and device loads, among other feasibly managed loads. In such embodiments where direct load management devices are available, each such device, whether installed at commercial, industrial, or residential premises, might "publish" the amount, type, and definition of loads that may be managed throughout the control area. In these embodiments, this information may be used by, for example, a network operator to determine minimum and maximum power reduction availability for the network through either a direct control signal or a price signal sent to the building, building system, machine, appliance, or device or to their owner/operator, to either cause or elicit interruption or reduction of its use. In this application, the precise amount of active or reactive loads can be managed throughout any designated control area of the power network toward meeting power network constraints and objectives. These embodiments also have application to creation of real-time markets for load reduction based on, among other factors or approaches, locational marginal pricing of such reductions generated by other functionalities of these embodiments.

The electric power network and market embodiment allows identification of preferential zones, enabling the user to de-rate the contribution of resources from areas outside the controlled power network and/or in areas where data is lacking. It may assign constraints hardness factors based on practical considerations. It may recognize zones where constraints are strictly enforced and zones where constraints can be relaxed.

A further embodiment of the electric power network and market embodiment supports dynamic power network simulator software, which presents network conditions to an operator or planner in a concise and comprehensive manner. This embodiment may show the user voltage, among other varied and numerous values, at all individual buses, and power flows, among other values, in network power lines. This embodiment uses the RSIs and the RSM and varied colors to highlight problem types and locations.

A further embodiment of the electric power network and market embodiment supports an optimized multi-objective unit commitment software program, a set of power network optimization problems involving determination of a start-up and shutdown schedule for all system generating units, typically over a short period (for example, periods of one day to one week) to meet forecasted load demand, at minimum cost, with minimum air emissions, among numerous other possible simultaneous objectives. In meeting the minimum cost objective, for example, the total generation cost may be minimized. In meeting the minimum emissions objective, the total emission of $SO_2$, $NO_x$, and $CO_2$ gases by all system generators, or by those in identified locations within the power network, can be minimized. This embodiment may structure a detailed definition of the unit commitment optimization problem, with a detailed representation of constraints, including, among others, spinning reserve constraints, ramp-rate constraints, multiple area import-export constraints, multiple fuel constraints and emission constraints, and with multiple network operating objectives. This embodiment allows a user to identify feasible compromises between and/or among competing objectives (for example, the minimum cost and minimum emission objectives), using a composite weighted objective, and a facility for generating trade-off curves to plot the exact relationship(s) between or among two or more competing objectives. Traditionally, the emission considerations are de-coupled from the unit commitment problem. The emission considerations are handled only during economic dispatch. In this embodiment, emission considerations may be tightly coupled with the unit commitment. This results in lower cost for the same amount of emission compared to the de-coupled methods. Traditionally, emission considerations are studied during economic dispatch (de-coupled).

The architecture of the power network and power market embodiments of the present invention may involve structuring and solving network optimization problems using specialized applications and objectives adopted to power system problems which are merged into, or layered onto the kernel of the embodiments of the present invention. This architecture applies complex sensitivity matrices (CSMs) specially designed for power network and/or power market optimizations. An aspect of use of such CSMs is assignment of a weighted index according to load deficiency or surplus at one or more individual bus(es).

The optimization procedure produces RSIs and the RSM indicating the deficiency or surplus of, for example, P (active power) and Q (reactive power) at various specified buses in the system. These indices also can be used for any of the other applications and objectives of the power network and power market embodiments described above and below. In these embodiments, the Resource Sensitivity Matrix (RSM) indicates the effect of adding, subtracting, or otherwise altering one or more network resources (for example, active or reactive power generation) or load at a bus. Each bus in the system has RSIs corresponding to, among other characteristics, P and Q resources. Adding a generation resource, for example, at a bus with a positive index reduces the objective and adding the generation at a negative index bus increases the objective. In these embodiments, the Resource Sensitivity Matrix (RSM) indicates approximately how much such alteration in resource or load is needed to bring the mathematical condition at the bus to its ideal value in a network optimized to specified objectives. In these embodiments, the RSM is useful in generating Infeasibility List(s), which are list(s) of the buses that either are infeasible or show trend toward infeasibility under specified network constraints and objectives. The Infeasibility List in these embodiments identifies buses that must be relaxed and buses on which constraints interfere with the goals. Using the Infeasibility List a system operator, utility, or other user can prioritize between and among alternative constraints and objectives.

A desirable approach to solving complex network problems is one that is capable of handling as much of the actual scale and complexity of a network as possible. Ideally, such an approach eliminates all problem-limiting assumptions; has the fundamental advantage of no objective specific assumptions; accommodates a wide range of problem definitions; can be used to solve a number of objectives without significant modification—allowing for new objectives to be added easily, and can allow a hypothesis to be used to efficiently test and improve the performance and usefulness of any optimization solution. Such an approach requires new, very high levels of complexity in the solution algorithm, without requiring significant computational resources. Newly introduced complexities must generate useful additional information that can be used to improve the operating and planning scenarios. For example, introduction of shadow variables corresponding to system constraints gives valuable information about the strength of these constraints. This approach should be able to detect and resolve infeasibility cases; and it should provide consistent and fast convergence.

Other embodiments of the present invention, among many others, address a complete range of network design, resource planning, and flow optimization problems in any type of problem that can be modeled as a networks flow system, including, among many other examples of such networks, liquid flows in a pipe network, data packet flows in guided and wireless media networks, vehicle flows in a road and track transportation networks, airplane flows in flight route and schedule networks, and passenger flows in mass transit networks.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which:

FIG. 2 depicts a flow chart of the algorithm of FIG. 1, according to embodiments of the invention.

FIG. 3 depicts a flow chart of the solution to the primal problem according to embodiments of the invention.

FIG. 4 depicts an example of a flow chart that may be used to solve an equation for use in FIG. 5, according to embodiments of the invention.

FIG. 5 depicts a flow chart of the solution to the dual problem, according to embodiments of the invention.

FIG. 6 depicts an example of a flow chart for detecting voltage collapse and/or over voltage problems, according to embodiments of the invention.

FIG. 7 depicts and example of a flow chart to allocate DR/DG locations for DER planning, according to embodiments of the invention.

DETAILED DESCRIPTION OF THE INVENTION

Among the most complicated problems in optimization is the problem of optimizing network flows in a large non-linear network. Existing methods for solving such problems simplify either the network and/or the problem in order to produce a solution. Such simplifications change the network and the problem, and by so doing, produce solutions that are not accurately responsive to actual network conditions. Even with the network and problem simplifications, such solutions require large amounts of computation time, and cannot be used in real-time to meet network operations challenges. Embodiments of the invention discussed here overcome these problems. Embodiments of the invention are capable of providing solutions to large size network flows (e.g. 10-50,000 nodes) in near real-time speeds (5-10 seconds on a desktop computer).

Figure 1:
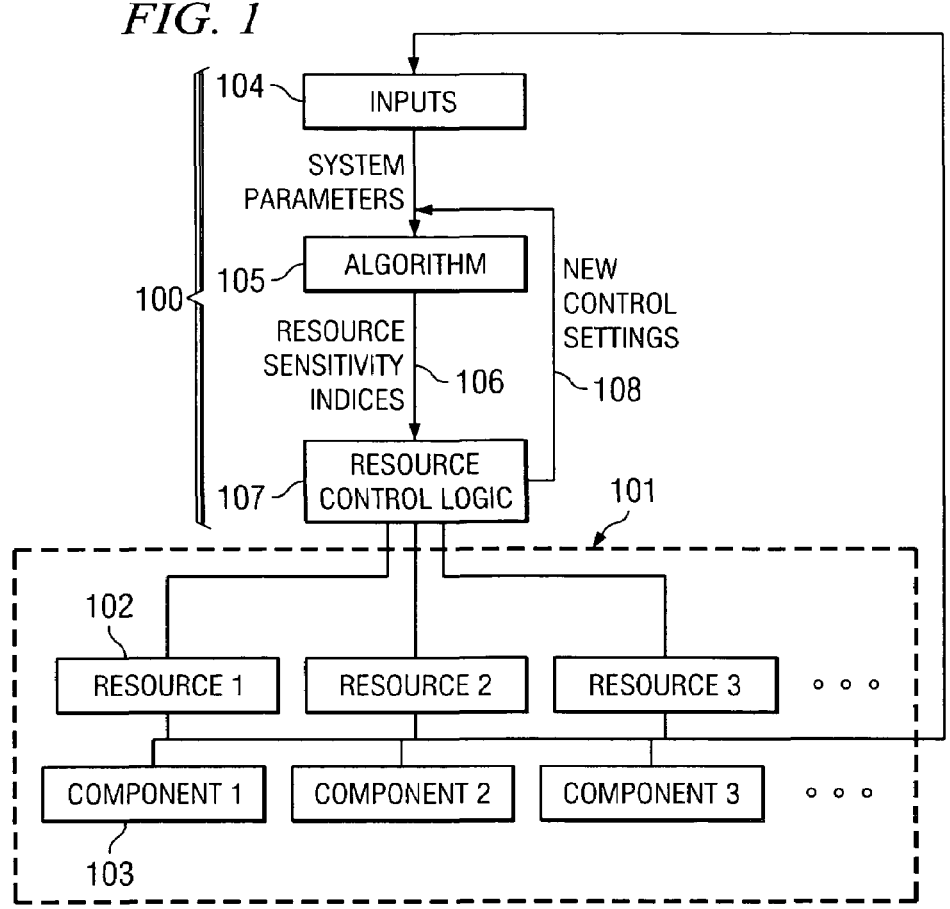
FIG. 1 depicts a schematic representation of an embodiment of the invention.

FIG. 1 depicts a schematic representation of an embodiment 100 of the invention used to analyze and/or optimize a system under test (SUT) 101. The SUT 101 comprises various resources 102 and components 103. For example, if SUT 101 is a power system, then the resources may comprise power generating sources and distribution systems, and the components may comprise power consumers. In any event, the embodiment includes inputs 104, which may include system parameters such as objectives for the system, constraints for the system, and description of the resources and components of the system. Such inputs may be provided by a user at a work station. Other inputs may include measurements from the system that are provided by sensors associated with the system (e.g. attached to the resources and/or components). Measurements may include real time measurements. For the example of a power system, the inputs may comprise current generation, load consumption, etc. These inputs are provided to the algorithm 105, which calculates resource sensitivity indices 106 from the input. The indices are provided to resource control logic 107 makes resource allocation decisions based on the indices. Any changes to the system made by the logic is provided to the algorithm by logic as new control settings 108. The algorithm may then produce new indices in view of the settings.

The basic network flow optimization problem can be defined as:

minimize $f(X)$ (0.1)

subject to $u_i(X)=0$, where $i=1, \ldots, N$ (0.2)

$v_j(X) \leq 0$, where $j=1, \ldots, N_v$ (0.3)

$x_{min,k} \leq x_k \leq x_{max,k}$, where $k=1, \ldots, N_x$ (0.4)

Where, $f(X)$ is the objective function expressed in terms of system variables $X=[x_1, x_2, \ldots, x_{N_x}]$, $u(X)$ is a set of equality constraints, and $v(X)$ is a set of inequality constraints. The variables generally have minimum and maximum limits.

In a network the equality constraints represent the flow balance at each node. In one example of a complex network, an electric power network, the sum of all flows converging at a node with the total generation and load at that node must be zero. Other types of networks have similar equality constraints. These constraints are hard constraints and represent the fixed physical aspects and limitations of the network. An interesting observation is that in such systems the number of primal variables and the number of equality constraints is exactly the same; that is, in the above set of equations $N_x=N_u$. Although this may not be true in basic problem definition, the problem can be reduced to this form. This feature is exploited by the algorithm to obtain fast results and to generate the resource sensitivity indexes (RSIs).

In an optimization problem compared to equality constraints, the inequality constraints are the very difficult to handle. At a given optimum point all the equality constraints are bound and hence must be satisfied. However, only some of the inequality constraints are bound at the optimum point. It is very difficult to determine these binding inequality constraints. Many traditional methods introduce slack variables and strong penalties such as quadratic and logarithmic to convert these inequality constraints into equality constraints. As result the number of variables in the optimization problem increases dramatically. This reduces the computation speed considerably. Another significant drawback of such an approach is that, if the optimization problem is infeasible, that is if there is no solution that satisfies all the constraints, the solution diverges. A real-world system, especially under stress, is generally infeasible. Optimization approaches described above hence become completely un-usable when they are really needed. Under these circumstances, a good optimization algorithm should suggest a solution that is close to the optimum point that is obtained by relaxing some soft constraints. Embodiments of the invention are designed to overcome these drawbacks.

The algorithm treats the equality and inequality constraints similarly. For the optimization problem defined by equations (0.1) to (0.4), the Lagrange function, L, is given as, $$L(X, \lambda, \mu, \rho, \sigma) = f(X) + \sum_i \lambda_i u_i(X) + \sum_{j \in T} \mu_j v_j(X) + \sum_{k \in S} \rho_k(x_k - \bar{x}_k) + \frac{1}{2}\sum_{k \in S} \sigma_k(x_k - \bar{x}_k)^2 \quad (0.5)$$

where $\lambda$ is the vector of multipliers for equality constraints, $\mu$ is the vector of multipliers for inequality constraints, T is the set of unsatisfied inequality constraints, $\rho$ is the vector of multipliers for violated variable limits, $\sigma$ is the vector of penalties for the violated limits, $\bar{x}$ is the violated limit of variable x, and S is the set of violated limits.

Embodiments of the invention solve the optimization problem using a min-max optimization method. This problem is defined as:

$$\underset{(\lambda,\mu,\rho)}{\text{maximize}}\left[\underset{(X)}{\text{minimize}}\, L(X, \lambda, \mu, \rho, \sigma)\right]. \quad (0.6)$$

Theoretically the minimization and maximization of the min-max problem should be carried out simultaneously. However, for numerical solutions these operations are carried out using primal-dual iterations using the procedure of FIG. 2.

FIG. 2 depicts a flow chart of the algorithm of FIG. 1, according to embodiments of the invention. After starting 201, the algorithm moves to box 202 which relaxes all the inequality constraints by setting all the multipliers and penalties to 0. This step also initializes the primal and dual variables using a "flat start" or a "hot start". Next, the algorithm minimize the Lagrange function with respect to the primal variables X, in box 203. This step is expanded in FIG. 3. Next, the algorithm tests whether all the constraints are satisfied; if satisfied and stationary point conditions are met, then stop in box 205; otherwise proceed to box 206. In this box, the dual variables ($\lambda$, $\mu$ and $\rho$) are updated so that the new value of the Lagrange function is maximized (dual step) and the algorithm returns to box 203. Because of the way the solution method proceeds, the algorithm may be categorized as a "primal-dual min-max" solution method.

The primal problem is to minimize the Lagrange function w.r.t. the primal variables, box 203 of FIG. 2. The primal problem may be solved using Newton's method of minimization. Limits on the primal variables are enforced during the primal solution.

At the minima of the primal problem, the gradients of the Lagrangian w.r.t the primal variables are zero. i.e.

$g=0$ (0.7)

Where, g is the gradient vector of the Lagrange function and $$g = \frac{\partial L}{\partial X} \quad (0.8)$$

The above set of equations is solved using Newton's method of solution of simultaneous non-linear algebraic equations. The values of X are updated iteratively, using the following expressions.

$$H\Delta X = -g \quad (0.9)$$

Hence, $$\Delta X = -H^{-1}g \quad (0.10)$$

Where, H is the Hessian matrix.

$$H = \frac{\partial^2 L}{\partial X^2} \quad (0.11)$$

The variables X are updated by incrementing, $$X = X_{old} k \Delta X \quad (0.12)$$

and $$0 \leq k \leq 1 \quad (0.13)$$

The step size constant k is selected such that upon increment only a small number of primal variables are at their limits. A quadratic penalty with a very small penalty factor ($\sigma$, with a value around 1-5) is applied to the violated variables. The Lagrange multipliers for these constraints ($\rho$) are set initially as 0. The multipliers and the penalties are updated during the dual solution step.

FIG. 3 depicts a flow chart 203 of the solution to the primal problem according to embodiments of the invention. The flow chart begins at start box 301 and uses a previous primal solution as the initial X, if available. If a previous solution is not available, primal variable values are selected using the "flat start" values. After moving through point P, box 302, the flow chart calculate the gradient vector g using equation (0.8), box 303. The flow chart then determines whether the gradient vector magnitude is below a threshold in box 304. If yes then stop box 310 and proceed to the dual solution box 501 of FIG. 5. If no, then the flow chart proceeds to box 305, wherein the flow chart form the Hessian matrix H using equation (0.11). The flow chart then calculates increments $\Delta X$ using equation (0.10), box 306, and then calculates the value of step-size k such that upon increment no limits (k=1), or only a small number of limits (k<1), of X are violated, box 307. The flow chart then increments X using equation (0.12), box 308 and then imposes quadratic and linear penalties on violated limits, box 309. Set initial quadratic penalty factors ($\sigma$) to very low value and the linear penalty value (the Lagrange multiplier $\rho$) to 0.0. After this box, the flow chart returns to point P, box 302.

Since the primal solution uses Newton's method, it converges within a small number of iterations, typically 2 to 5. Close to the optimum point, the number of primal iterations required is generally 1.

Once the gradient values are below tolerance in box 304, the solution proceeds to dual solution of FIG. 5. In the dual solution, the dual variables are updated. The dual solution is not iterative and involves the update of dual variables.

The solution to the dual problem is to maximize the Lagrange function with respect to the dual variables, the Lagrange multipliers of the unsatisfied constraints. The gradient of the Lagrange function with respect to the dual variables is the vector of constraint violations.

The Lagrange multipliers can be updated using different methods such as gradient search or conjugate gradient methods. However, fast convergence is achieved if these are modified using a dual Hessian or a matrix that is approximate dual Hessian.

$$\Delta \Lambda = M^{-1} W \quad (0.14)$$

$$\Lambda = \Lambda_{old} + k_d \Delta \Lambda \quad (0.15)$$

Where, $\Delta \Lambda$ is the vector of multiplier increment.

M is the dual Hessian matrix

W is the vector of constraint violations $k_d$ is the dual update step size

There are many derivations for dual Hessian matrices in literature. One such expression is, $$M = A^T H^{-1} A \quad (0.16)$$

Where, $$A = \frac{\partial^2 L}{\partial X \partial \Lambda} \quad (0.17)$$

Obtaining a dual Hessian matrix similar to that expressed in equation (0.16) has some serious drawbacks when implemented to optimize large networks with thousands of nodes. The matrix ends up being extremely dense, and the computational time and memory requirements overwhelm even the current generation of supercomputers. Even though matrices H and A are sparse, the solution of equation (0.14) becomes too time- and memory-consuming. To overcome these problems, the algorithm uses a more approximate approach that results in fast and efficient implementation of the dual problem solution.

All large networks have a set of hard, physical equality constraints that represent flow balances at every node. For example, in an electric power transmission network these are represented as Kirchoff's Law, which states that at every node the total power entering the node, plus the total generation at that node, plus the total load at that node, must balance; i.e., total power entering a node must sum to 0. This holds true with respect to both active and reactive power. In fluid flow networks, the amount of fluid that is flowing into a node must balance with the liquid that is flowing out of the node along with storage and leakage losses.

A second set of constraints that comprise of soft inequality constraints are applied on the system that generally contain operational limitations. Many of these limits are not physical limits, but rather are security or operational limits that can be violated under emergency conditions. These limits are also sometimes called functional limits. The number of violated secondary limits under any conditions is generally small.

Based on this fact, the dual solution in the algorithm separates constraints into 3 categories and updates them separately. The 3 categories of constraints are:

1. A set of strong or dominant constraints (U), which comprises of dominant equality constraints.

2. A set of secondary constraints (V), which mostly contains inequality constraints that are currently violated.
3. A set of variable limits (R), which are enforced using Lagrange multiplier and quadratic penalty combination.

Note that the set V contains unsatisfied inequality constraints, and hence the number of dual variables in this set is generally very small and they can be updated using D in equation (0.16).

For sets of dominant constraints the matrix A becomes a square matrix. In such cases, equation (0.14) is transformed to $$\Delta\Lambda_U = (A_u^T)^{-1} H_U A_U^{-1} W_U \quad (0.18)$$

Or $$\Delta\Lambda_U = D_U W_U \quad (0.9)$$

Where, matrices and vectors with subscript u correspond to the dominant set of constraints.

Even though the matrix $D_U$ above is dense, it can be easily and calculated as a function of two sparse matrices and their inverses. In computer implementation, no dense matrices are needed to be stored. Only LU factors of matrix A (which are sparse) and the primal Hessian H (which is also sparse) need to be stored. The matrix $D_U$ can be calculated just using 2 LU substitutions and a sparse matrix multiplication.

FIG. 4 depicts an example of a flow chart that may be used to solve equation (0.18). Equation (0.18) is solved in box 504 of FIG. 5. After starting the flow chart in box 401, the flow chart LU decompose matrix A, in box 402. It then, in box 403 uses LU solve to obtain temporary vector $T_1$ using $$T_1 = A_U^{-1} W_U \quad (0.20)$$

The flow chart then, in box 404 solves for temporary vector $T_2$ using matrix multiplication $$T_2 = H_U T_1 \quad (0.21)$$

After which, in box 405, the flow chart then solves for multiplier increment using LU solve $$\Delta\Lambda_U = (A_U^T)^{-1} T_2 \quad (0.22)$$

and then stops, box 406.

These operations are extremely economic in terms of computer run time and memory usage. Calculation of $D_U$ on a desktop computer for network of thousands of nodes requires just a few milliseconds. Since all the operations in the algorithm involve sparse matrix operations, very fast and efficient computer implementation of this algorithm can be done.

The secondary constraints are modified using the M matrix as defined in equation (0.16).

$$\Delta\Lambda_V = (A^T H^{-1} A)^{-1} W_V \quad (0.23)$$

Since the number of secondary constraints is very small, this update can be carried out using dense matrices. In fact in most cases, there will be no secondary constraints.

The multipliers corresponding to limits on variables are updated using the penalty factors.

$$\rho_i = \rho_{i,old} + \sigma_i (x_i - \bar{x}_i) \quad (0.24)$$

Among inequality constraints and variable limits, only those that are currently violated are enforced. For any such constraints to be binding, the multipliers must meet the Lagrange multiplier sign criteria, i.e. multipliers for the constraints that are bound at their maximum limit must be positive, for those that are bound at their minimum limit the multipliers must be negative. If any multiplier corresponding to an inequality constraint does not meet this criterion, that constraint is not binding, and hence is relaxed.

The dual step size $k_d$ is selected using linear interpolation such that its value is small (0.1) at the first iteration and approaches 0.0 as the constraint violations approach 0. Other interpolation curves such as sigmoid can also be used to determine the value of $k_d$.

Penalty factors are updated until the norm of limit violations is within a tolerable value. The updates are done based on the current violation of limits using the following logic:

Let $|c|$ be the norm of limit violations.

$$\text{For any limit violation } c_i > \tfrac{1}{4}|c| \text{ set } \sigma_i = k\sigma_{i,old}. \quad (0.25)$$

FIG. 5 depicts a flow chart of the solution to the dual problem, according to embodiments of the invention. The flowchart is entered through start box 501, which corresponds to box 310 of FIG. 3. The flowchart begins by checking to determine whether all of the constraints are satisfied, box 502. If yes, then there is a solution, the optimization process has converged, and the iterations stop, box 510. If no, then the flow chart proceeds to box 503, which formulates matrices $A_U$ and $A_V$. The flow chart then calculates primary constraint multiplier increments using equation (0.18), box 504 and FIG. 4. The flow chart then calculate secondary constraint multiplier increments using equations (0.16) and (0.14), box 505. The flow chart then calculates the value of dual step size $k_d$ based on current mismatches, box 506. The flow chart then increment the primal and secondary multipliers using equation (0.15), box 507, and then increment the multipliers corresponding to primal variable limits (ρ) using equation (0.24), box 508. Finally, the flow chart increment the penalty factors using equation (0.25), box 509, and then returns to the primal solution at point P box 302 of FIG. 3 via box 511.

From equation (0.5), $$\frac{\partial L}{\partial u_i} = \lambda_i \quad (0.26)$$

Similarly, $$\frac{\partial L}{\partial v_i} = \mu_i \quad (0.27)$$

This means that the Lagrange multipliers represent the change in the Lagrange function, hence the objective function, for small perturbations in the constraints. Primary constraints represent the nodal balances in a networked system. Therefore it can be inferred that the primary multipliers represent the change in objective function due to changes in the nodal resources. Therefore, these are generally called the shadow prices.

Consider a single node, i, in the network. Let $G_i$ be the total resource production at that node. Let $C_i$ be the total resource consumed at the node. Let $F_{ji}$ be the flow from another node, j, into the node. Then, the node balance equation is:

$$G_i - C_i + \sum_j F_{ji} = 0 \quad (0.28)$$

Then, $$\frac{\partial L}{\partial G_i} = \lambda_i + \frac{\partial f}{\partial G_i} \qquad (0.29)$$

Similarly, $$\frac{\partial L}{\partial C_i} = \lambda_i + \frac{\partial f}{\partial C_i} \qquad (0.30)$$

The differentials shown in equations (0.29) and (0.30) are known as the resource sensitivity indexes (RSIs) for node i. These indexes indicate the sensitivity of the Lagrange function, and hence the objective function, to the change in the resources at a given node. Generally, the differentials on the right hand side of the above equations are constants, or in some cases 0.

For example, consider minimum production cost objective. A simple form of the objective is expressed as:

$$F(G) = \sum_i c_i G_i \qquad (0.31)$$

Where, $c_i$ is the cost per unit of production.

Therefore the RSI for production at node i is:

$$\frac{\partial L}{\partial G_i} = \lambda_i + c_i \qquad (0.32)$$

A second set of indexes is the Resource Sensitivity Matrix (RSM) that indicate the sensitivity of the RSIs with respect to changes in the resources at the nodes is obtained from (0.19). The equation gives the relationship between the multiplier increments and changes in the resource balance at each node. A change in any given node, affects all the nodes in the system. This is why this sensitivity is expressed as a matrix (D).

$$\frac{\partial \Gamma}{\partial G} = D \qquad (0.33)$$

Where, $\Gamma$ is the vector of RSIs.

These two sets of indexes can be used for a large number of fast and accurate planning and real-time resource allocation applications on networked systems. A specific embodiment of the invention for power systems that is discussed later in this specification defines a number of such applications for the indexes.

Multiplier increments obtained by setting all the elements of $W_U$ to 0, except for a single element j, which is set to 1 and then solving equation (0.18) gives the sensitivity of the RSI corresponding to resource j to changes in resource j alone. Such sensitivity values are used to establish maximum limits on resource addition at nodes.

Although the present invention and its advantages have been described in detail, it should be understood that various changes, substitutions and alterations can be made-herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The following discussion relates to embodiments of the invention directed at power systems, e.g. power generation, transmission, distribution, and/or consumption.

For an electric power network to operate efficiently, the network must be designed and operated based on the numerous diverse, system operating constraints. Constraints are classified into "equality" constraints and "inequality" constraints. The objective function and equality constraints generally are non-linear. Most of the inequality constraints are limits on system dynamic variables. There are three types of constraints that limit the power transfer capability of the transmission system: voltage limit constraints, thermal/current line limit constraints, and system operating constraints. Optimizing the operation of the power grid within the confines of each of these constraints is a complex task—especially if all objectives are to be met.

Increasingly, bulk power networks are operating at least in part as complex markets in which an increasing variety of costs and price incentives and disincentives are assigned to system resources and conditions in an effort to have market mechanisms recruit system resources and encourage and discourage actions of market participants, while assuring that the electric power system operates securely. Structuring and operating such markets has proven to be exceptionally complex, as both the markets themselves and the power systems are vast, rich networks. Power market optimization problems are directly related to power network optimization problems, and involve identification and application of system variables, constraints, and objectives.

One example is congestion and marginal pricing considerations. Power network "congestion" refers to conditions in which the system is being used to full capacity and is unable efficiently to accommodate increments of power flow. In congestion conditions, additional transmission efforts between a generator and load reduce the efficiency of other transmissions on the transmission grid. Congestion is most likely to occur during peak demand (load) periods, when generators seeking to satisfy peak demands seek to deliver power via transmission lines subject to flow and thermal limits. The Federal Energy Regulatory Commission has approved a variety of transmission congestion pricing systems for use by transmission authorities known as Regional Transmission Operators and Independent System Operators.

Common types of such pricing systems include the following. Zonal pricing assumes that there are no transmission constraints within the zone and, accordingly, sets a single price within the zone. Locational marginal pricing (sometimes called "Nodal Pricing" is a transmission pricing system that attempts to take full account of transmission loop flows. Loop flows are a complication of the physics of electricity (electricity follows the path of least resistance) that results in transmission congestion arising in places and at times that are counter to the intuitive, traditional view of transmission as a point-to-point delivery of electric energy. Locational marginal pricing assesses congestion charges based on the transmission congestion caused throughout the transmission system by a particular transaction.

Another example of power network optimization problems is constraint. The amount of power on a transmission line is the product of the voltage and the current and a hard-to-control factor called the "power factor." Additional power can be transmitted reliably if there is sufficient available transfer capability on all lines in the system over which the power would flow to accommodate the increase and certain contingencies or failures that could occur on the system.

Electric power analysis applications that seek to optimally schedule generation and control devices and transmission facilities subject to power flow and device operational constraints generally are categorized as either "load flow" or Optimal Power Flow (OPF) applications. The control devices typically scheduled include active and reactive power generation devices, tap-changing transformers, and switched capacitors. Other applications for power network optimization are virtually limitless.

Power network optimization studies currently are performed in planning mode only, using static models of pieces of the system in a range of scenarios with assigned values for, e.g., generation, transmission, load, and interior transfer, to plan locations, size, numbers, and system mitigations for both upgraded and new system facilities; to identify system operating responses for forecasted contingency events; and to perform, among other planning studies, after-the-fact analyses of system events that actually have occurred.

If network optimizations ultimately can be done in real time or near-real time, i.e., for actual conditions, rather than off-line in planning mode, system limitations can be calculated and re-calculated at very brief, regular time intervals as the system operates. Such calculations require on-line data that provide immediate measurements of actual loading, generation, and transmission system status. On-line dynamic security assessment eliminates all assumptions about future operating conditions because actual data on system operating conditions are used. The usefulness of this data is dependent on the capabilities of system optimization tools. System re-controls can be set and re-set at optimum levels at corresponding time intervals, and the system can be operated closer to actually applicable limitations, with (among numerous other possible benefits) far fewer active and reactive power losses, reduced congestion, much closer matching of system resources and load, reduced fuel use, reduced air emissions, increased overall system efficiency, and reduced operating costs.

Operation of a network that is poorly planned, designed, and engineered can be "optimized", but ultimately will be difficult to operate efficiently. To avoid expensive inconsistencies, it would be preferable to identical tools for both design engineering and operation of the transmission system, provided the tools have the requisite capabilities to address both planning and operations functions. At this time, no commercial product is able to meet the needs of both the power network planner/designer and the power network operator. Current load flow planning tools are too slow for operating applications purposes, and current OPF operational packages are too inaccurate and inflexible (i.e., unable to apply any combination of simultaneous objective functions to be used reliably for either system operations or planning/design.

Optimizing power transmission networks is one of the most complicated and demanding non-linear optimization problem among network flow systems. The equations representing transmission systems are highly non-linear. The system is very fast reacting and hence fast computer response time is required to control the system in real-time. The number of nodes in the network is usually large (usually tens of thousands of nodes). The number of variables is at least twice that of the number of nodes. Hence even for planning applications very fast algorithms are required. Currently, there are no algorithms other than embodiments of the invention that can quickly solve large transmission system optimization problems and at the same time generate the indexes. No other method can solve large transmission optimization problem using very accurate and detailed problem definition. The algorithm is the only algorithm that can optimize large transmission systems using very accurate problem definition and yet generate the indexes in near real-time speed.

Currently, transmission system operators use different tools for planning and real-time optimization. Generally, real-time applications make a large number of assumptions to optimize the system in real-time. Due to these assumptions, the results obtained from planning applications and real-time applications often do not match, and may conflict. This can cause problems during operations, including blackouts. Due to near real-time speed the algorithm avoids this problem. The algorithm's implementation for power transmission systems is fast enough to be used in real-time and accurate enough to be used for planning applications. The basic problem definition of the algorithm does not make any assumptions or simplifications.

In real world applications it is necessary to balance multiple considerations during optimization. Such optimization is called multi-objective optimization. The algorithm can handle multiple objectives. In such cases a weighted sum of multiple objectives is used.

In a power transmission system there are two types of power flows, active power (P) flows and reactive power (Q) flows. These flows are controlled using resources such as generators, capacitors, transformer taps and nodal voltage magnitudes and angles. Controllable parameters of these devices are the primal variables for transmission system optimization. All the objectives can be expressed as functions of the above primal variables. To enumerate, the primal variables are:

1. Bus (nodal) voltage magnitudes (V),
2. Bus voltage angles ($\delta$),
3. Active and reactive power generation of generators (P and Q),
4. Switchable capacitor capacitance (B), and
5. Tap changing transformer tap positions (t).

Power flow in a transmission system is governed by Kirchoff's law, which states that the sum of power flowing into any given node, the total generation and load must be equal to 0. That is, for a given node i, $$\sum_j P_{ji} + P_{gi} - P_{li} = 0 \tag{0.34}$$

$$\sum_j Q_{ji} + Q_{gi} - Q_{li} = 0 \tag{0.35}$$

Where,
$P_{ji}$ and $Q_{ji}$ are the active and reactive power flows from node j into node I,
$P_{gi}$ and $Q_{gi}$ are active and reactive power generations at node I, and, $P_{li}$ and $Q_{li}$ are active and reactive power consumption by loads at node I.

The flow balance equations (0.34) and (0.35) are used as primary constraints. The constraint violations for these constraints are the P and Q mismatch vectors used in loadflow.

It is also interesting to note that the matrix A of equation (0.17) becomes, $$A = \frac{\partial^2 L}{\partial X \partial \Lambda} = J \quad (0.36)$$

Where, matrix J is the Jacobian matrix used in loadflow. Therefore the sensitivity matrix D for the primary constraints is expressed as, $$D = ((J^T)^{-1} H J^{-1})^{-1} \quad (0.37)$$

The following constraints are used as secondary constraints in transmission systems:
1. Line flow limits including security and thermal limits,
2. Branch group flow limits, and
3. Inter-area tie-line flow limits.

The following primal variable limits are used as the third set of constraints:
1. Nodal voltage minimum and maximum limits ($V_{min}$ and $V_{max}$),
2. Generator active power minimum and maximum limits ($P_{min}$ and $P_{max}$),
3. Generator reactive power minimum and maximum limits ($Q_{min}$ and $Q_{max}$),
4. Transformer tap minimum and maximum limits ($t_{min}$ and $t_{max}$), and
5. Switched capacitor capacitance minimum and maximum limits ($B_{min}$ and $B_{max}$).

Among the above limits, only the voltage limits need to be enforced using both quadratic penalties and linear penalties. All other limits can be enforced by just using linear penalties using Lagrange multipliers.

Main objectives used for transmission system optimization are:
1. Minimum active and reactive power loss,
2. Minimum generation cost,
3. Minimum reactive power cost,
4. Minimum emission, and
5. Minimum deviation from an operating point.

The algorithm can use any of the objectives above individually, or in combination.

Selection of starting points affects the solution time of iterative numerical algorithms. The closer the starting point is to the optimum point, the faster the solution converges. Based on the available information about a system the algorithm may use either of 2 types of starting points.

The first type is warm start, where information from a previous optimization run using the same objective, of a given transmission line with load and generation profile that is very close to the current state is available this mode of start is used. The primal and dual variable values from the previous run are used as the starting point for the current run of the optimization iterations. Since the new optimum point is generally very close to the previous point, the optimization iterations will converge very quickly.

Warm start is generally used for real-time operations. During real-time operations the optimization is run every few minutes and the system change during this interval is small. Hence a warm start results in quick solution.

The second type is flat (cold) start, where previous information with the same objective and similar system state is not available. This type has all the Lagrange multipliers are set to the same initial value, and the voltage magnitudes are set to a value between the minimum and maximum limits. With this type, all voltage angles are set to 0, and all generator P and Q values are set to 0.

Such a starting point is called a flat or cold starting point. Generally, more number of iterations are required to arrive at the optimum point with cold start compared to those for the warm start. Cold start is generally used in planning studies.

RSI's and the RSM have many applications in power systems. Resource sensitivity indexes in power transmission systems indicate the sensitivity of the objective to changes in active and reactive power generation and load changes at each bus (node) in the transmission system. There is an active power RSI and a reactive power RSI for each and every bus in the transmission system. The RSIs also indicate the scarcity or surplus of resources at the buses in the system. For example, if the index is positive at a given bus, it indicates that there is scarcity of resources at that bus. If it is negative, it means that there is surplus of resource at the bus. Scarcity of resources at buses also indicates the resource stress at those buses. RSM can be used to quickly determine the change in RSIs as a result of changes in resources or vice versa. These facts allow us to use RSIs and the RSM in various kinds of applications.

Embodiments of the invention may be used to detect stress of the transmission system. As mentioned above, RSIs indicate P and Q stress at each bus in the system. These stress values can be displayed using color contours on the geographical map of the system to visualize the overall state of the transmission system.

The algorithm optimization should use minimum active and reactive power loss objective or similar objective that optimizes the system voltage profile.

Embodiments of the invention may be used to predict the likelihood of a voltage collapse and/or an over voltage condition. System buses that have high positive reactive power RSIs are highly scarce of reactive power and hence have a very high reactive power stress. These are the buses that have a very high likelihood of voltage collapse. Reactive power resources must be added to these buses to prevent voltage collapse. The RSM indicates the effect of adding reactive power at the stressed buses on the stress and hence voltage collapse condition.

Buses that have a very high negative reactive power RSIs (i.e. the very high absolute value) have too much reactive power generation. Such buses have over voltage problems. Reactive power being injected at these buses must be reduced to prevent over voltage problems. Again, RSM indicates the effect of reactive power resource changes at these buses on the RSI.

The algorithm optimization should use the minimum active and reactive power loss objective or a similar objective that optimizes the system voltage profile.

FIG. 6 depicts an example of a flow chart for detecting voltage collapse and/or over voltage problems, according to embodiments of the invention. The flow chart begins at the start box 601, and then runs the algorithm of FIG. 2, box 602, which in turn generates the RSIs and the RSM values, box 603. The buses may then be sorted according to their Q RSIs in ascending order, box 604. The buses at the top of the list have high negative Q RSIs, which indicates the likelihood of over voltage problems, box 605. The buses at the bottom of the list have high positive Q RSIs, which indicates the likelihood of under voltage and hence voltage collapse problems, box 606.

Embodiments of the invention may be used to assist with load shedding.

Active power RSIs indicate active power stresses in the system and therefore they can be used to determine the most effective loads to shed under system emergency conditions. Objectives such as minimum active and reactive power loss or similar objectives that improve the system reliability must be used for optimization.

The following is an example of the procedure that may be used to determine which load(s) to shed. Note that this procedure is similar to that of FIG. 6. First, the algorithm is run, generating active power RSIs. Next, the buses may be sorted according to descending order of active power RSIs. The sorted list is the load shedding priority list, with the first element in the list having highest priority for load shedding.

The amount of load reduced must not be large enough to cause the active RSIs at the bus to swing towards −ve values. The sensitivity of the RSIs at a bus to changes in active power resources at the bus can be obtained by setting the elements of $W_U$ corresponding to the P resource at the bus to I and rest of the element to 0, and solving equation (0.18). This sensitivity value is used to determine the maximum limit on the amount of load shed.

Embodiments of the invention may be used to assist with distributed energy resource (DER) planning.

Distributed Energy resources are used to reduce the peak load on the system and hence reduce transmission congestion. Reducing the peak load on a system has many benefits. One benefit reduces the system peak load, which reduces the transmission system congestion and losses, hence increasing the reliability of the system and reducing the cost of power. Another benefit is that power generation by peak load serving generators, which is very expensive compared to base load generators, is reduced. This reduces the generation cost and hence the cost of power. Another benefit is that by reducing the peak load, existing infrastructure can be used more efficiently and more load can be served using existing infrastructure, thus reducing new infrastructure costs.

There are typically two kinds of distributed energy resources. The first is demand response (DR). In this mode, customer load demand is curtailed during peak hours. The second is distributed generation (DG). In this mode, distributed generators are small generators (few kW to a few MW capacity) located especially at load centers. Under heavy load conditions these generators supply power to the loads around them, thus reducing the stress on the transmission system.

DER have biggest benefit to the system where the loads are high and supplying power to those locations results in large amount of losses. In other words, DER is very beneficial at locations where adding a fixed amount of resource reduces the objective the most. As explained in sections above, bus with the highest positive RSI is the most sensitive bus, and hence the best place for DER.

FIG. 7 depicts and example of a flow chart to allocate DR/DG locations for DER planning, according to embodiments of the invention. The flow chart begins at the start box 701, and then runs the algorithm of FIG. 2, box 702, which in turn generates the RSIs values, box 703. The buses may then be sorted according to their RSIs in descending order, box 704. Using the sorted RSIs, box 705, selected the first bus from the top of the list that meets the DER constraints, box 706. If such a bus is found, then the DER resource is added to that bus, box 708, and the flow chart returns to box 702. If not, then the process ends, box 709.

While adding distributed resources at any given bus, care should be taken not to add too much resource. Adding too much resource will result in the RSI becoming negative and hence affecting the system badly. The maximum limit on the resource allocation can be obtained similar to load shedding application in section 0 using the sensitivity of the RSI of the bus to change in the resources at the bus.

Embodiments of the invention may be used to assist with reactive power planning.

Utilities and transmission system operators perform regular planning studies to ensure proper reactive power and voltage support in the transmission system under various load conditions. Typically, 5-6 'study cases' are chosen. These study cases represent different loading conditions of the transmission system, generally high and low load scenarios during various seasons. These cases are studied and a list of new resources to be added or modifications done to existing resources is generated. Traditionally, planning engineers have used simple loadflow tools and heuristic rules to perform these studies. Such approaches to studies result in sub-optimal results due to several reasons. For example, one reason is that such studies do not exploit existing resources in the system optimally. Another reason may be that because the studies do not use any optimization tools the results of the study are also not optimal.

Using the algorithm and the reactive power RSIs optimal results are obtained. Running the algorithm on the system re-schedules existing resources optimally to meet the system objective. Using RSIs to decide on locations to place new resources improves the system performance while retaining optimal operation.

Under many circumstances, just a simple optimization of the system may provide enough benefits to not require any additional resource additions to the system, thus saving large amount of expenses to the transmission system owner.

The following is an example of the procedure that may be used to determine locations for new reactive power resources. Note that this procedure is similar to that of FIG. 7. First, the algorithm is run, which then generates reactive power RSIs for each case being studied. Next, the cases may be sorted according to descending order of reactive power RSIs. Locations that consistently have large positive RSIs among the study cases are good locations for fixed reactive power generation resources, such as fixed capacitors. Locations that have some variability in their RSIs, but generally high positive RSIs are good locations for controllable reactive power generation resources, such as static VAr devices (SVDs).

Embodiments of the invention may be used to assist with transmission congestion detection.

The difference in the value of RSIs at two ends of a transmission line indicates the amount of congestion in the transmission line. The greater or higher the difference, the more congestion on the line.

The following is an example of the procedure that may be used to prioritize transmission lines according to their congestion. Note that this procedure is similar to that of FIG. 7. First, the algorithm is run. Using the generated RSI values, calculate the RSI difference between the two buses of each transmission line. Next, the lines may be sorted according to descending order of the absolute value of the RSI difference. The list now indicates transmission lines in descending order according to congestion.

Embodiments of the invention may be used to assist with transmission system expansion planning.

Similar to adding reactive power resources explained above, RSIs can be used to plan generator additions to the system, studying the affect of adding large loads and transmission lines to the system. The RSIs can also be used to select best projects from a list of proposed projects.

All these planning processes involve running the algorithm on the transmission system and then calculating and sorting the RSIs in descending order. Limits on adding resources is again calculated using the RSM with resource update at a single bus.

Embodiments of the invention may be used to assist with generator expansion.

Locations with high positive RSIs are best places to add new generators. The maximum limit on generator capacity to be added at any site is determined using the RSM.

Embodiments of the invention may be used to assist with transmission line expansion.

When a transmission system gets congested, and the transmission requirements exceed transmission capacity new transmission lines are added to the system to relieve congestion.

As explained earlier, the RSIs indicate active and reactive power stresses at system buses. High positive RSI indicates a scarce of resources and high negative index indicates surplus of resources. Transmission lines that connect active power surplus areas to active power deficient areas are beneficial. A transmission line that connects the bus with the highest positive index to the bus with highest negative index is the most beneficial to the system.

Embodiments of the invention may be used to assist with locational marginal pricing.

Many of the ISOs currently use Locational Marginal Pricing (LMP) to price power at various locations in the transmission system. Currently available methods use the DC Optimal Power Flow approach to calculate LMPs in real-time. The DC OPF formulation is a very approximate optimization and hence the LMPs generated are not accurate. Also the LMPs represent 'marginal price' which indicates the change in objective due to infinitesimally small changes in resources. There are no indicators to show how the marginal prices will change due to changes in resources. Another main drawback of existing methods is that they can only give LMPs for active power resources under a minimum cost objective.

Using the algorithm and RSIs all the above problems are solved. The algorithm uses accurate models of the power system and hence the LMPs obtained are accurate. The RSMs provide the sensitivity of the LMPs to changes in resources. LMPs for reactive power as well as active power, under many types of objectives can be obtained using the algorithm.

Active power RSIs generated when used with a minimum cost are LMPs from a conventional sense. These are more accurate than what is currently used.

Embodiments of the invention may be used to assist with 3-D security envelope.

The 3-D security envelope maps the three-dimensional bounds within which a transmission area can operate securely, without violating any limits, or causing the system to become unstable. One of the challenges of generating such a boundary is the amount of computation needed. Since RSIs indicate stressed locations in the system, the algorithm can be used to reduce the amount of searching needed to map the boundary and hence drastically reduce the run-time requirements.

Embodiments of the invention may be used to assist with transmission system asset management.

Traditional transmission asset management tools do not consider the affect of the asset on the over all system. With The algorithm RSIs, asset upgrades that maximally benefit the grid as well as the utility can be calculated.

Figure 8:
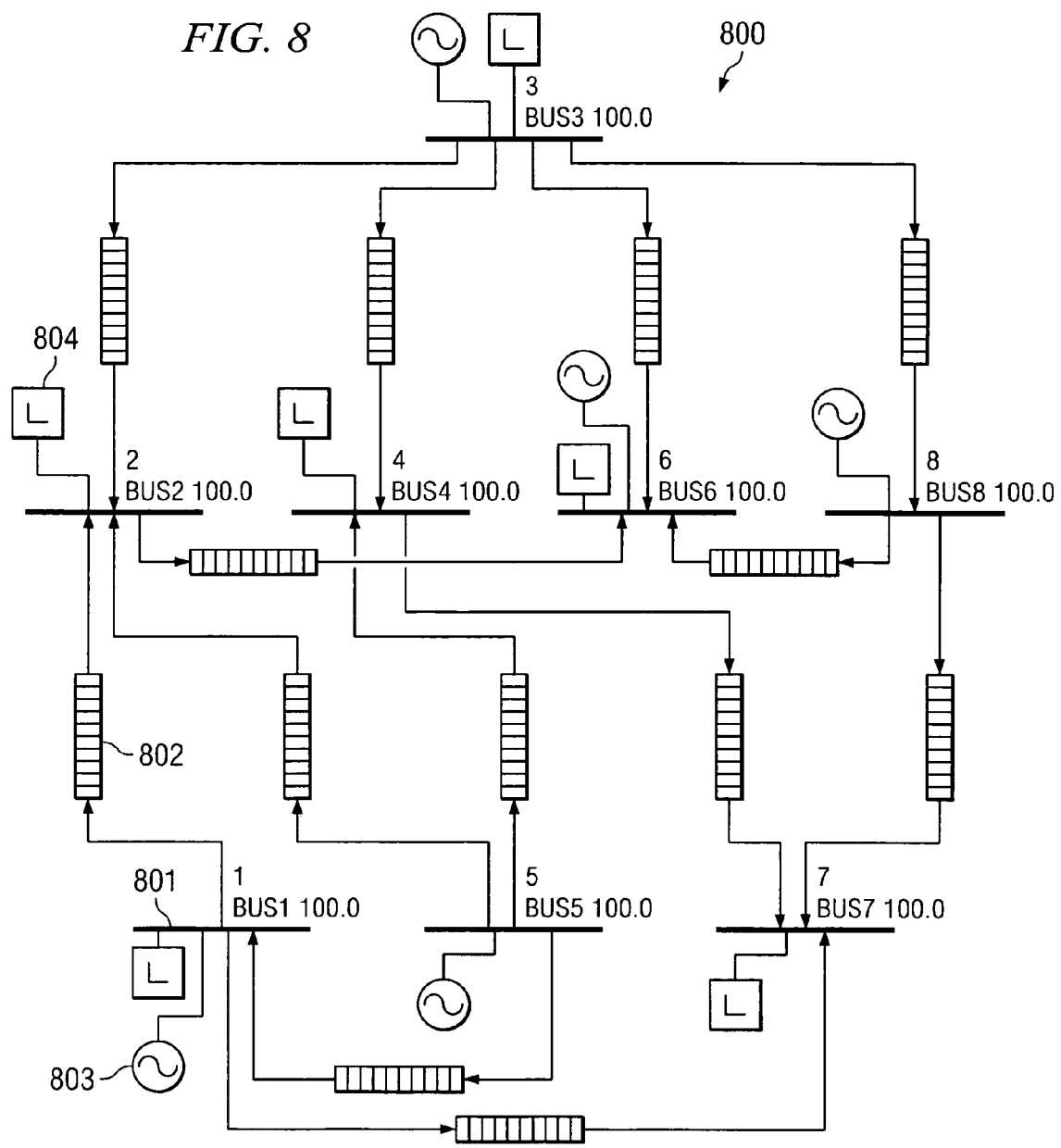
FIG. 8 depicts a power transmission network 800 that comprises 8 buses.

The following is a transmission system example using the algorithm to optimize a small power transmission network of 8 buses. FIG. 8 depicts a power transmission network 800 that comprises 8 buses total (e.g. 801) of which 5 are generator buses (e.g. 803) that are connected by transmission lines (e.g. 802) as shown in the figure. The remaining buses are load only buses (e.g. 804).

The following table lists the bus data:

| Bus Number | Bus Index | Bus Type | Vmax | Vmin | P load (MW) | Q load (MVAr) |
|---|---|---|---|---|---|---|
| 1 | 0 | Slack bus | 1.03 | 0.97 | 100 | −20 |
| 2 | 1 | Load Bus | 1.03 | 0.97 | 150 | 10 |
| 3 | 2 | Generator Bus | 1.03 | 0.97 | 170 | 25 |
| 4 | 3 | Load Bus | 1.03 | 0.97 | 50 | −10 |
| 5 | 4 | Generator Bus | 1.03 | 0.97 | 0 | 0 |
| 6 | 5 | Generator Bus | 1.03 | 0.97 | 300 | 10 |
| 7 | 6 | Load Bus | 1.03 | 0.97 | 210 | 22 |
| 8 | 7 | Generator Bus | 1.03 | 0.97 | 0 | 0 |

The following table lists the transmission line data:

| From Bus | To Bus | R | X | Yc |
|---|---|---|---|---|
| 1 | 2 | 0.00495 | 0.0495 | 0.0 |
| 1 | 5 | 0.00495 | 0.0495 | 0.0 |
| 1 | 7 | 0.007072 | 0.07072 | 0.0 |
| 2 | 3 | 0.006601 | 0.066 | 0.0 |
| 2 | 5 | 0.00396 | 0.0396 | 0.0 |
| 2 | 6 | 0.005506 | 0.05506 | 0.0 |
| 3 | 4 | 0.002475 | 0.02475 | 0.0 |
| 3 | 6 | 0.004715 | 0.04715 | 0.0 |
| 3 | 8 | 0.009901 | 0.09901 | 0.0 |
| 4 | 5 | 0.00495 | 0.0495 | 0.0 |
| 4 | 7 | 0.0033 | 0.033 | 0.0 |
| 6 | 8 | 0.002829 | 0.02829 | 0.0 |
| 7 | 8 | 0.0022 | 0.022 | 0.0 |

The following table lists the generator data:

| Generator Bus | P(MW) | Pmax (MW) | Pmin (MW) | Q (MVAr) | Qmax (MVAr) | Qmin (MVAr) | Scheduled V |
|---|---|---|---|---|---|---|---|
| 1 | 180 | 400 | 0 | 33 | 400 | −400 | 1.0 |
| 3 | 350 | 400 | 0 | −227 | 400 | −400 | 1.03 |
| 5 | 200 | 400 | 0 | 0 | 400 | −400 | 1.0 |
| 6 | 200 | 400 | 0 | 38 | 400 | −400 | 1.02 |
| 8 | 50 | 400 | 0 | −130 | 400 | −400 | 1.03 |

Based on the data above, the $Y_{bus}$ matrix for the system is generated. Matrices shown below give the real ($G_{bus}$) and imaginary ($B_{bus}$) component of the matrix.

$$G_{bus} = \begin{pmatrix} 5.4 & -2 & 0 & 0 & -2 & 0 & -1.4 & 0 \\ -2 & 7.8 & -1.5 & 0 & -2.5 & -1.8 & 0 & 0 \\ 0 & -1.54 & 8.6 & -4 & 0 & -2.1 & 0 & -1 \\ 0 & 0 & -4 & 9 & -2 & 0 & -3 & 0 \\ -2 & -2.5 & 0 & -2 & 6.5 & 0 & 0 & 0 \\ 0 & -1.8 & -2.1 & 0 & 0 & 7.4 & 0 & -3.5 \\ -1.4 & 0 & 0 & -3 & 0 & 0 & 8.9 & -4.5 \\ 0 & 0 & -1 & 0 & 0 & -3.5 & -4.5 & 9 \end{pmatrix} \quad (0.38)$$

$$B_{bus} = \begin{pmatrix} -54 & 20 & 0 & 0 & 20 & 0 & 14 & 0 \\ 20 & -78 & 15 & 0 & 25 & 18 & 0 & 0 \\ 0 & 15 & -86 & 40 & 0 & 21 & 0 & 10 \\ 0 & 0 & 40 & -90 & 20 & 0 & 30 & 0 \\ 20 & 25 & 0 & 20 & -65 & 0 & 0 & 0 \\ 0 & 18 & 21 & 0 & 0 & -74 & 0 & 35 \\ 14 & 0 & 0 & 30 & 0 & 0 & -89 & 45 \\ 0 & 0 & 10 & 0 & 0 & 35 & 45 & -90 \end{pmatrix} \quad (0.39)$$

The algorithm will use minimum active power and minimum reactive power loss objectives with equal weight. The losses are considered for only the transmission system, e.g. along transmission lines and transformers. The objective is optimized using the following primal variables: active power generation of the generator at the slack bus, voltage magnitudes of all the buses, and voltage angle of all the buses, except the slack bus, where the angle is held at 0 degrees.

This type of optimization is also called reactive power optimization, since only reactive power sources are scheduled during optimization. Active power sources, except the slack generator is assumed fixed.

$$\theta(X) = P_{loss} + Q_{loss} \quad (0.40)$$

Where, $$P_{loss} = \sum_{i=0}^{7} \sum_{j=0}^{7} P_{ij} \quad (0.41)$$

$$Q_{loss} = \sum_{i=0}^{7} \sum_{j=0}^{7} Q_{ij} \quad (0.42)$$

$P_{ij}$ and $Q_{ij}$ are the active and reactive power flowing from bus i to bus j. These values exist only if there is a branch between bus i and bus j.

$$P_{ij} = V_i^2 G_{ii} + V_i V_j Y_{ij} \cos(\theta_{ij} + \delta_j - \delta_i) \quad (0.43)$$

$$Q_{ij} = -V_i^2 B_{ii} - V_i V_j Y_{ij} \sin(\theta_{ij} + \delta_j - \delta_i) \quad (0.44)$$

Where, $V_i$ is the voltage magnitude at bus i, $\delta_i$ is the voltage angle at bus i, $G_{ij}$ and $B_{ij}$ are the (i, j)th element of $G_{bus}$ and $B_{bus}$ matrices, $Y_{ij}$ is the magnitude of the (i, j)th element of the $Y_{bus}$ matrix, and $\theta_{ij}$ is the angle of the (i, j)th element of the $Y_{bus}$ matrix.

The above objective is minimized subject to equality, inequality constraints and variable limits. The network power flow equations are used as the equality constraints. i.e.

$$\sum_{j=0}^{7} P_{ij} + P_{G,i} - P_{L,i} = 0 \quad (0.45)$$

$$\sum_{j=0}^{7} Q_{ij} + Q_{G,i} - Q_{L,i} = 0 \quad (0.46)$$

Where, $P_{G,i}$ is the active power generation at bus i, $Q_{G,i}$ is the reactive power generation at bus i, $P_{L,i}$ is the active power load at bus i, and $Q_{L,i}$ is the reactive power load at bus i.

The limits considered are:

Generator reactive power limits, $$Q_{G\,min,i} \leq Q_{G,i} \leq Q_{G\,max,i} \quad (0.47)$$

Bus voltage magnitude limits, $$V_{min,i} \leq V_i \leq V_{max,i} \quad (0.48)$$

Transformer tap limits, and $$t_{min,i} \leq t_i \leq t_{max,i} \quad (0.49)$$

SVD limits $$B_{min,i} \leq B_i \leq B_{max,i} \quad (0.50)$$

Since the given system does not contain any transformers and SVDs, their limits are not used in this example.

Therefore, the Lagrange function for the system described here is, $$L(X) = \sum_{i=0}^{7} \sum_{j=0}^{7} P_{ij} + \sum_{i=0}^{7} \sum_{j=0}^{7} Q_{ij} + \sum_{i=0}^{7} \lambda_{p,i} \left( \sum_{j=0}^{7} P_{ij} + P_{G,i} - P_{L,i} \right) + \sum_{i=0}^{7} \lambda_{q,i} \left( \sum_{j=0}^{7} Q_{ij} + Q_{G,i} - Q_{L,i} \right) + \sum_{i=0}^{7} \lambda_{v,i} (V_i - \overline{V}_i) + \sum_{i=0}^{7} \sigma_{v,i} (V_i - \overline{V}_i)^2 \quad (0.51)$$

The problem can be further simplified by, eliminating some generator reactive power generation, $Q_{G,i}$. Since the Lagrangian is linear in terms of active and reactive power generation, the equations corresponding to them can be eliminated from the optimization by forcing the equality constraints at buses that contain dispatchable $Q_G$, and setting the Lagrange multiplier $\lambda_q$ for these buses to 0. If a $Q_G$ is dispatched outside its limits, the limit is enforced and the power mismatch equation at that bus is re-introduced to the optimization problem. In this case, $\lambda_q$ for this bus becomes non-zero. Active power generation at the slack bus can be handled similarly by setting $\lambda_p$ to 0.

The algorithm (or a user) selects a flat starting point since there are no previous optimized results for the system close to the current load and generator profile. For the stating point: All voltage magnitudes are set to 1.0 pu, all voltage angles are set to 0 radians, all schedulable reactive power generation are set to 0 pu, the slack bus active power generation is set to 0 pu, all the $\lambda_p$ are set to 0.3 except at slack bus where it is set to 0, all the $\lambda_q$ are set to 0.1 except at buses that have generators, and all the $\lambda_v$ and penalty factors are set to 0.

The gradient vector is obtained by taking the differential of the Lagrange function with respect to the primal variables.

$$g = \frac{\partial L}{\partial X} \quad (0.52)$$

The resulting vector has 16 elements.

$$g = \begin{pmatrix} \frac{\partial L}{\partial \delta_1} \\ \frac{\partial L}{\partial V_1} \\ \vdots \\ \frac{\partial L}{\partial \delta_7} \\ \frac{\partial L}{\partial V_7} \end{pmatrix} \quad (0.53)$$

With flat starting point described above, the value of the initial gradient vector is:

$$g = \begin{pmatrix} -15.86 \\ -5.02 \\ 5.22 \\ 8.4 \\ 0.55 \\ -5.5 \\ -0.6 \\ 6 \\ 6.45 \\ -3.9 \\ 0.18 \\ -1.8 \\ 3.61 \\ 6.32 \\ 0.45 \\ -4.5 \end{pmatrix} \quad (0.54)$$

As seen in equation (0.37) the Jacobian matrix is required to calculate the dual updates. The Jacobian matrix is obtained using the following:

$$J = \frac{\partial^2 L}{\partial X \partial \Lambda} \quad (0.55)$$

$$= \frac{\partial S_m}{\partial X}$$

$$= \begin{pmatrix} \frac{\partial P_{m,0}}{\partial \delta_0} & \frac{\partial P_{m,0}}{\partial V_0} & \cdots & \frac{\partial P_{m,0}}{\partial \delta_7} & \frac{\partial P_{m,0}}{\partial V_7} \\ \frac{\partial Q_{m,0}}{\partial \delta_0} & \frac{\partial Q_{m,0}}{\partial V_0} & \cdots & \frac{\partial Q_{m,0}}{\partial \delta_7} & \frac{\partial Q_{m,0}}{\partial V_7} \\ \vdots & \vdots & \ddots & \vdots & \vdots \\ \frac{\partial P_{m,7}}{\partial \delta_0} & \frac{\partial P_{m,7}}{\partial V_0} & \cdots & \frac{\partial P_{m,7}}{\partial \delta_7} & \frac{\partial P_{m,7}}{\partial V_7} \\ \frac{\partial Q_{m,7}}{\partial \delta_0} & \frac{\partial Q_{m,7}}{\partial V_0} & \cdots & \frac{\partial Q_{m,7}}{\partial \delta_7} & \frac{\partial P_{m,7}}{\partial V_7} \end{pmatrix}$$

Where, $S_m$ is the active and reactive power mismatch vector and contains the equality constraint violation values.

Jacobian matrix is used in Newton based loadflow algorithms extensively. For the given system the Jacobian matrix at the first iteration has the following values:

0 0 54.000114756372
0 1 5.399587679431
0 2 −20.000019998
0 3 −1.9997999998
0 8 −20.000019998
0 9 −1.9997999998
0 12 −14.000074760372
0 13 −1.399987679831
1 0 −5.399587679431
1 1 54.000114756372
1 2 1.9997999998
1 3 −20.000019998
1 8 1.9997999998
1 9 −20.000019998
1 12 1.399987679831
1 13 −14.000074760372
2 0 −20.000019998
2 1 −1.9997999998
2 2 77.983724766397
2 3 7.798149476373
2 4 −14.999895750418
2 5 −1.500057749156
2 8 −25.0000249975
2 9 −2.49974999975
2 10 −17.983784020479
2 11 −1.798541727668
2 12 0.0
2 13 0.0
3 0 1.9997999998
3 1 −20.000019998
3 2 −7.798149476373
3 3 77.983724766397
3 4 1.500057749156
3 5 −14.999895750418
3 8 2.49974999975
3 9 −25.0000249975
3 10 1.798541727668
3 11 −17.983784020479
3 12 0.0
3 13 0.0

4 2 −14.999895750418
4 3 −1.500057749156
4 4 86.000946036787
4 5 8.599973190937
4 6 −40.00083201472
4 7 −3.999759988544
4 8 0.0
4 9 0.0
4 10 −21.000228271639
4 11 −2.100156453237
4 12 0.0
4 13 0.0
4 14 −9.99999000001
4 15 −0.999999000001
5 2 1.500057749156
5 3 −14.999895750418
5 4 −8.599973190937
5 5 86.000946036787
5 6 3.999759988544
5 7 −40.00083201472
5 8 0.0
5 9 0.0
5 10 2.100156453237
5 11 −21.000228271639
5 12 0.0
5 13 0.0
5 14 0.999999000001
5 15 −9.99999000001
6 4 −40.00083201472
6 5 −3.999759988544
6 6 90.00117901383
6 7 8.999319983001
6 8 −20.000019998
6 9 −1.9997999998
6 10 0.0
6 11 0.0
6 12 −30.00032700111
6 13 −2.999759994657
6 14 0.0
6 15 0.0
7 4 3.999759988544
7 5 −40.00083201472
7 6 −8.999319983001
7 7 90.00117901383
7 8 1.9997999998
7 9 −20.000019998
7 10 0.0
7 11 0.0
7 12 2.999759994657
7 13 −30.00032700111
7 14 0.0
7 15 0.0
8 0 −20.000019998
8 1 −1.9997999998
8 2 −25.0000249975
8 3 −2.49974999975
8 4 0.0
8 5 0.0
8 6 −20.000019998
8 7 −1.9997999998
8 8 65.0000649935
8 9 6.49934999935
8 10 0.0
8 11 0.0
8 12 0.0
8 13 0.0
8 14 0.0
8 15 0.0
9 0 1.9997999998
9 1 −20.000019998
9 2 2.49974999975
9 3 −25.0000249975
9 4 0.0
9 5 0.0
9 6 1.9997999998
9 7 −20.000019998
9 8 −6.49934999935
9 9 65.0000649935
9 10 0.0
9 11 0.0
9 12 0.0
9 13 0.0
9 14 0.0
9 15 0.0
10 2 −17.983784020479
10 3 −1.798541727668
10 4 −21.000228271639
10 5 −2.100156453237
10 6 0.0
10 7 0.0
10 8 0.0
10 9 0.0
10 10 73.984635301476
10 11 7.399007940997
10 12 0.0
10 13 0.0
10 14 −35.000623009357
10 15 −3.500309760092
11 2 1.798541727668
11 3 −17.983784020479
11 4 2.100156453237
11 5 −21.000228271639
11 6 0.0
11 7 0.0
11 8 0.0
11 9 0.0
11 10 −7.399007940997
11 11 73.984635301476
11 12 0.0
11 13 0.0
11 14 3.500309760092
11 15 −35.000623009357
12 0 −14.000074760372
12 1 −1.399987679831
12 2 0.0
12 3 0.0
12 4 0.0
12 5 0.0
12 6 −30.00032700111
12 7 −2.999759994657
12 8 0.0
12 9 0.0
12 10 0.0
12 11 0.0
12 12 89.000892263146
12 13 8.899387666474
12 14 −45.000490501665
12 15 −4.499639991985
13 0 1.399987679831
13 1 −14.000074760372
13 2 0.0
13 3 0.0
13 4 0.0
13 5 0.0

13 6 2.999759994657
13 7 −30.00032700111
13 8 0.0
13 9 0.0
13 10 0.0
13 11 0.0
13 12 −8.899387666474
13 13 89.000892263146
13 14 4.499639991985
13 15 −45.000490501665
14 4 −9.99999000001
14 5 −0.999999000001
14 6 0.0
14 7 0.0
14 8 0.0
14 9 0.0
14 10 −35.000623009357
14 11 −3.500309760092
14 12 −45.000490501665
14 13 −4.499639991985
14 14 90.001103511032
14 15 8.999948752078
15 4 0.999999000001
15 5 −9.99999000001
15 6 0.0
15 7 0.0
15 8 0.0
15 9 0.0
15 10 3.500309760092
15 11 −35.000623009357
15 12 4.499639991985
15 13 −45.000490501665
15 14 −8.999948752078
15 15 90.001103511032

In the above values, the first column is the row number of the Jacobian, the second column is the column number of the Jacobian, and the third column is the value of the Jacobian element. Any element that is not given in the file has a value of 0.

Hessian matrix is formed by taking the second derivatives of the Lagrange function with respect to the primal variables, i.e. the voltage magnitudes and the voltage angles.

$$H = \begin{pmatrix} \frac{\partial^2 L}{\partial \delta_0^2} & \frac{\partial^2 L}{\partial \delta_0 \partial V_0} & \cdots & \frac{\partial^2 L}{\partial \delta_0 \partial \delta_7} & \frac{\partial^2 L}{\partial \delta_0 \partial V_7} \\ \frac{\partial^2 L}{\partial V_0 \partial \delta_0} & \frac{\partial^2 L}{\partial V_0^2} & \cdots & \frac{\partial^2 L}{\partial V_0 \partial \delta_7} & \frac{\partial^2 L}{\partial V_0 \partial V_7} \\ \vdots & \vdots & \cdots & \vdots & \vdots \\ \frac{\partial^2 L}{\partial \delta_7 \partial \delta_0} & \frac{\partial^2 L}{\partial \delta_7 \partial V_0} & \cdots & \frac{\partial^2 L}{\partial \delta_7^2} & \frac{\partial^2 L}{\partial \delta_7 \partial V_7} \\ \frac{\partial^2 L}{\partial V_7 \partial \delta_0} & \frac{\partial^2 L}{\partial V_7 \partial V_0} & \cdots & \frac{\partial^2 L}{\partial V_7 \partial \delta_7} & \frac{\partial^2 L}{\partial V_7^2} \end{pmatrix} \quad (0.56)$$

The initial Hessian matrix values at the starting point are:
0 0 123.819290651272
0 1 −15.860055658948
0 2 −46.59958199534
0 3 −5.80002599942
0 8 −44.59957999554
0 9 −6.0000059994
0 12 −32.620128660392
0 13 −4.060023660128
1 0 −15.860055658948
1 1 118.799404871606
1 2 5.80002599942
1 3 −46.59958199534
1 8 6.0000059994
1 9 −44.59957999554
1 12 4.060023660128
1 13 −32.620128660392
2 0 −46.59958199534
2 1 5.80002599942
2 2 183.441070648064
2 3 5.220191051763
2 4 −35.399931223682
2 5 −0.150005774916
2 8 −58.9994024941
2 9 −0.249974999975
2 10 −42.442154934942
2 11 −0.179854172767
2 12 0.0
2 13 0.0
3 0 −5.80002599942
3 1 −46.59958199534
3 2 5.220191051763
3 3 191.839383124643
3 4 0.150005774916
3 5 −35.399931223682
3 8 0.249974999975
3 9 −58.9994024941
3 10 0.179854172767
3 11 −42.442154934942
3 12 0.0
3 13 0.0
4 2 −35.399931223682
4 3 0.150005774916
4 4 199.861895146526
4 5 0.54998177377
4 6 −94.401123201126
4 7 0.399975998854
4 8 0.0
4 9 0.0
4 10 −47.460863321696
4 11 0.0
4 12 0.0
4 13 0.0
4 14 −22.599977400023
4 15 0.0
5 2 −0.150005774916
5 3 −35.399931223682
5 4 0.54998177377
5 5 194.361822370012
5 6 −0.399975998854
5 7 −94.401123201126
5 8 0.0
5 9 0.0
5 10 0.0
5 11 −47.460863321696
5 12 0.0
5 13 0.0
5 14 0.0
5 15 −22.599977400023
6 4 −94.401123201126
6 5 −0.399975998854
6 6 215.400740584956
6 7 −0.599955998834
6 8 −47.19952199528
6 9 −0.19997999998
6 10 0.0
6 11 0.0
6 12 −73.80009538855

6 13 0.0
6 14 0.0
6 15 0.0
7 4 0.399975998854
7 5 −94.401123201126
7 6 −0.599955998834
7 7 221.400825786228
7 8 0.19997999998
7 9 −47.19952199528
7 10 0.0
7 11 0.0
7 12 0.0
7 13 −73.80009538855
7 14 0.0
7 15 0.0
8 0 −44.59957999554
8 1 6.0000059994
8 2 −58.9994024941
8 3 0.249974999975
8 4 0.0
8 5 0.0
8 6 −47.19952199528
8 7 0.19997999998
8 8 150.79850448492
8 9 6.449960999355
8 10 0.0
8 11 0.0
8 12 0.0
8 13 0.0
8 14 0.0
8 15 0.0
9 0 −6.0000059994
9 1 −44.59957999554
9 2 −0.249974999975
9 3 −58.9994024941
9 4 0.0
9 5 0.0
9 6 −0.19997999998
9 7 −47.19952199528
9 8 6.449960999355
9 9 146.89843998531
9 10 0.0
9 11 0.0
9 12 0.0
9 13 0.0
9 14 0.0
9 15 0.0
10 2 −42.442154934942
10 3 0.179854172767
10 4 −47.460863321696
10 5 0.0
10 6 0.0
10 7 0.0
10 8 0.0
10 9 0.0
10 10 169.005069651591
10 11 0.179854172767
10 12 0.0
10 13 0.0
10 14 −79.102051394953
10 15 0.0
11 2 −0.179854172767
11 3 −42.442154934942
11 4 0.0
11 5 −47.460863321696
11 6 0.0
11 7 0.0
11 8 0.0
11 9 0.0
11 10 0.179854172767
11 11 167.206691249543
11 12 0.0
11 13 0.0
11 14 0.0
11 15 −79.102051394953
12 0 −32.620128660392
12 1 4.060023660128
12 2 0.0
12 3 0.0
12 4 0.0
12 5 0.0
12 6 −73.80009538855
12 7 0.0
12 8 0.0
12 9 0.0
12 10 0.0
12 11 0.0
12 12 212.6203180816
12 13 3.61005966093
12 14 −106.200094032658
12 15 −0.449963999199
13 0 −4.060023660128
13 1 −32.620128660392
13 2 0.0
13 3 0.0
13 4 0.0
13 5 0.0
13 6 0.0
13 7 −73.80009538855
13 8 0.0
13 9 0.0
13 10 0.0
13 11 0.0
13 12 3.61005966093
13 13 218.940370911753
13 14 0.449963999199
13 15 −106.200094032658
14 4 −22.599977400023
14 5 0.0
14 6 0.0
14 7 0.0
14 8 0.0
14 9 0.0
14 10 −79.102051394953
14 11 0.0
14 12 −106.200094032658
14 13 0.449963999199
14 14 207.902122827634
14 15 0.449963999199
15 4 0.0
15 5 −22.599977400023
15 6 0.0
15 7 0.0
15 8 0.0
15 9 0.0
15 10 0.0
15 11 −79.102051394953
15 12 −0.449963999199
15 13 −106.200094032658
15 14 0.449963999199
15 15 203.402073777467

In the above values, the first column is the row number of the Hessian, the second column is the column number of the Hessian, and the third column is the value of the Hessian element. Any element that is not given in the file has a value of 0.

The optimization is done using the algorithm as described in FIGS. 1-5. The final results are given in the table below:

|  | P loss (MW) | Q loss (MVAr) |
| --- | --- | --- |
| Before Optimization | 2.25903 | 22.59143 |
| After Optimization | 1.75007 | 17.50167 |

The following table provides the final results of the bus voltages and multipliers:

| Bus Number | Voltage Magnitude (pu) | Voltage Angle (degrees) | $\lambda_p$ | $\lambda_q$ | $\lambda_v$ |
| --- | --- | --- | --- | --- | --- |
| 1 | 1.03 | 0 | 0 | 0 | 0.014 |
| 2 | 1.026 | −1.257 | 0.049 | 0.004 | 0 |
| 3 | 1.03 | −0.275 | 0.0107 | 0 | 0.056 |
| 4 | 1.028 | −1.07 | 0.0414 | 0.0012 | 0 |
| 5 | 1.03 | 0.838 | −0.032 | 0 | 0.308 |
| 6 | 1.027 | −1.94 | 0.075 | 0 | 0 |
| 7 | 1.023 | −2.50 | 0.0975 | 0.007 | 0 |
| 8 | 1.028 | −1.75 | 0.0674 | 0 | 0 |

The following table provides the final results of the generator values:

| Bus Number | $P_G$ (MW) | $Q_G$ (MVAr) | Scheduled V (pu) |
| --- | --- | --- | --- |
| 1 | 181.79 | −7.6 | 1.03 |
| 3 | 350 | 31.61 | 1.03 |
| 5 | 200 | −1.85 | 1.03 |
| 6 | 200 | 15.73 | 1.0272 |
| 8 | 50 | 16.60 | 1.0277 |

At the final solution point the value of gradient vector g are zero.

The final Hessian matrix values are:
0 0 126.037895368122
0 1 0.002693561543
0 2 −46.691014822124
0 3 −0.000238492275
0 8 −46.613711768533
0 9 0.001492084847
0 12 −32.733168777466
0 13 0.001448552893
1 0 0.002693561543
1 1 118.799404871605
1 2 0.00023755044
1 3 −44.189927007509
1 8 −0.001492168855
1 9 −43.940068380691
1 12 −0.001438943128
1 13 −31.063491713635
2 0 −46.691014822124
2 1 0.00023755044
2 2 182.031915689276
2 3 −0.000281165919
2 4 −35.028543961462
2 5 −0.000855467716
2 8 −58.307033067409
2 9 −0.000060666087
2 10 −42.005323838281
2 11 0.00039953193
2 12 0.0
2 13 0.0
3 0 −0.000238492275
3 1 −44.189927007509
3 2 −0.000281165919
3 3 172.964615378228
3 4 0.000858772554
3 5 −33.155532096852
3 8 0.000060910044
3 9 −55.180605642523
3 10 −0.000400024404
3 11 −39.863717045886
3 12 0.0
3 13 0.0
4 2 −35.028543961462
4 3 0.000858772554
4 4 200.919464613226
4 5 0.001494909282
4 6 −93.435735403281
4 7 0.001800855321
4 8 0.0
4 9 0.0
4 10 −49.081759898403
4 11 −0.000636362839
4 12 0.0
4 13 0.0
4 14 −23.373425350079
4 15 −0.00052442587
5 2 −0.000855467716
5 3 −33.155532096852
5 4 0.001494909282
5 5 189.385717527558
5 6 −0.001797449389
5 7 −88.266223531372
5 8 0.0
5 9 0.0
5 10 0.000634695287
5 11 −46.400114165028
5 12 0.0
5 13 0.0
5 14 0.000523312536
5 15 −22.085371905031
6 4 −93.435735403281
6 5 −0.001797449389
6 6 210.217158567135
6 7 0.000121716029
6 8 −46.654955827179
6 9 0.001494579901
6 10 0.0
6 11 0.0
6 12 −70.126467336675
6 13 0.000426909138
6 14 0.0
6 15 0.0
7 4 0.001800855321
7 5 −88.266223531372
7 6 0.000121716029
7 7 198.96303354772
7 8 −0.00149764778
7 9 −44.066739995172
7 10 0.0
7 11 0.0
7 12 −0.000424923569
7 13 −66.682255560988

7 14 0.0
7 15 0.0
8 0 −46.613711768533
8 1 −0.001492168855
8 2 −58.307033067409
8 3 0.000060910044
8 4 0.0
8 5 0.0
8 6 −46.654955827179
8 7 −0.00149764778
8 8 151.575700663121
8 9 −0.002925998661
8 10 0.0
8 11 0.0
8 12 0.0
8 13 0.0
8 14 0.0
8 15 0.0
9 0 0.001492084847
9 1 −43.940068380691
9 2 −0.000060666087
9 3 −55.180605642523
9 4 0.0
9 5 0.0
9 6 0.001494579901
9 7 −44.066739995172
9 8 −0.002925998661
9 9 142.581051417298
9 10 0.0
9 11 0.0
9 12 0.0
9 13 0.0
9 14 0.0
9 15 0.0
10 2 −42.005323838281
10 3 −0.000400024404
10 4 −49.081759898403−
10 5 0.000634695287
10 6 0.0
10 7 0.0
10 8 0.0
10 9 0.0
10 10 172.89255551746
10 11 −0.000323998306
10 12 0.0
10 13 0.0
10 14 −81.805471780775
10 15 −0.000560549618
11 2 0.00039953193
11 3 −39.863717045886
11 4 −0.000636362839
11 5 −46.400114165028
11 6 0.0
11 7 0.0
11 8 0.0
11 9 0.0
11 10 −0.000323998306
11 11 163.875625276138
11 12 0.0
11 13 0.0
11 14 0.000560829215
11 15 −77.500453817285
12 0 −32.733168777466
12 1 −0.001438943128
12 2 0.0
12 3 0.0
12 4 0.0
12 5 0.0
12 6 −70.126467336675
12 7 −0.000424923569
12 8 0.0
12 9 0.0
12 10 0.0
12 11 0.0
12 12 208.067378047247
12 13 −0.00094434293
12 14 −105.207741933106
12 15 0.000927003604
13 0 0.001448552893
13 1 −31.063491713635
13 2 0.0
13 3 0.0
13 4 0.0
13 5 0.0
13 6 0.000426909138
13 7 −66.682255560988
13 8 0.0
13 9 0.0
13 10 0.0
13 11 0.0
13 12 −0.00094434293
13 13 198.772792955134
13 14 −0.000931119101
13 15 −100.063764262292
14 4 −23.373425350079
14 5 0.000523312536
14 6 0.0
14 7 0.0
14 8 0.0
14 9 0.0
14 10 −81.805471780775
14 11 0.000560829215
14 12 −105.207741933106
14 13 −0.000931119101
14 14 210.38663906396
14 15 0.000157971885
15 4 −0.00052442587
15 5 −22.085371905031
15 6 0.0
15 7 0.0
15 8 0.0
15 9 0.0
15 10 −0.000560549618
15 11 −77.500453817285
15 12 0.000927003604
15 13 −100.063764262292
15 14 0.000157971885
15 15 199.215604199883

In the above values, the first column is the row number of the Hessian, the second column is the column number of the Hessian, and the third column is the value of the Hessian element. Any element that is not given in the file has a value of 0.

The final Jacobian matrix values are:
0 0 59.052645173345
0 1 13.073463472123
0 2 −21.546293338613
0 3 0.554595777323
0 8 −22.454 −46765153
0 9 0.67379604521
0 12 −15.051884183202
0 13 0.384449094148
1 0 1.647683102309
1 1 60.003160341988

1 2 −0.55700015174
1 3 −21.453285542615
2 5 551973.1
1 8 −0.705352976231
1 9 −21.449872632224
1 12 −0.385329974338
1 13 −15.017474956085
2 0 −21.009433251892
2 1 −4.507028711182
2 2 81.840801789746
2 3 5.110636527952
2 4 −15.730959461699
2 5 −1.441238303332
2 8 −26.298548195359
2 9 −2.371029419514
2 10 −18.801860880796
2 11 −1.730331572677
2 12 0.0
2 13 0.0
3 0 4.812142998382
3 1 −19.677328563131
3 2 −10.599030352463
3 3 75.156101421299
3 4 1.504318687571
3 5 −15.071315348064
3 8 2.482075502925
3 9 −25.121972070642
3 10 1.800493163585
3 11 −18.069190244712
3 12 0.0
3 13 0.0
4 2 −15.717325437428
4 3 −1.633570611156
4 4 91.187175645836
4 5 8.980496035672
4 6 −41.772570971031
4 7 −4.345074627673
4 8 0.0
4 9 0.0
4 10 −22.807866355323
4 11 −2.194878339952
4 12 0.0
4 13 0.0
4 14 −10.889412882054
4 15 −1.046066157796
5 2 1.640652733932
5 3 −15.649479252706
5 4 −9.364960342765
5 5 92.166666035353
5 6 4.349067335512
5 7 −41.734221214937
5 8 0.0
5 9 0.0
5 10 2.283876401718
5 11 −21.919089757293
5 12 0.0
5 13 0.0
5 14 1.091363871604
5 15 −10.437 −441251784
6 4 −41.806656937935
6 5 −3.840105668155
6 6 92.868610286291
6 7 9.00657759498
6 8 −20.966762081793
6 9 −1.895509842032
6 10 0.0
6 11 0.0
6 12 −30.095191266563
6 13 −3.017500201689
6 14 0.0
6 15 0.0
7 4 4.008180122257
7 5 −40.053584264459
7 6 −9.016879441736
7 7 87.384411707598
7 8 1.98428518252
7 9 −20.028725826149
7 10 0.0
7 11 0.0
7 12 3.024414136959
7 13 −30.02639241993
7 14 0.0
7 15 0.0
8 0 −21.87025362298
8 1 −4.811641624102
8 2 −26.269340453249
8 3 −2.762207253653
8 4 0.0
8 5 0.0
8 6 −20.944550565792
8 7 −2.204397148345
8 8 69.084144642022
8 9 3.942176059209
8 10 0.0
8 11 0.0
8 12 0.0
8 13 0.0
8 14 0.0
8 15 0.0
9 0 5.137377424444
9 1 −20.483568554123
9 2 2.774182426791
9 3 −26.155944918366
9 4 0.0
9 5 0.0
9 6 2.206422778404
9 7 −20.925322196865
9 8 −10.11798262964
9 9 70.09525192021
9 10 0.0
9 11 0.0
9 12 0.0
9 13 0.0
9 14 0.0
9 15 0.0
10 2 −18.786044882938
10 3 −1.950184022581
10 4 −22.808449488319
10 5 −2.182520483193
10 6 0.0
10 7 0.0
10 8 0.0
10 9 0.0
10 10 79.591058187855
10 11 7.671198724966
10 12 0.0
10 13 0.0
10 14 −37.996563816599
10 15 −3.645607086209
11 2 1.958638779656
11 3 −18.704952112008
11 4 2.278045442785
11 5 −21.852025979458
11 6 0.0

```
11 7 0.0
11 8 0.0
11 9 0.0
11 10 -8.040156722052
11 11 77.479582665276
11 12 0.0
11 13 0.0
11 14 3.803472499611
11 15 -36.419 -493585277
12 0 -14.677533508598
12 1 -3.145300899903
12 2 0.0
12 3 0.0
12 4 0.0
12 5 0.0
12 6 -30.09819467776
12 7 -2.991628274476
12 8 0.0
12 9 0.0
12 10 0.0
12 11 0.0
12 12 91.852500213151
12 13 7.011601960967
12 14 -47.076772026794
12 15 -4.313376429849
13 0 3.358229705909
13 1 -13.746903397265
13 2 0.0
13 3 0.0
13 4 0.0
13 5 0.0
13 6 2.994377294616
13 7 -30.070562707835
13 8 0.0
13 9 0.0
13 10 0.0
13 11 0.0
13 12 -10.852765202835
13 13 86.767114687301
13 14 4.50015820231
13 15 -45.122822293114
14 4 -10.889892601539
14 5 -1.041003828911
14 6 0.0
14 7 0.0
14 8 0.0
14 9 0.0
14 10 -37.997266335991
14 11 -3.64850788066
14 12 -47.035767548262
14 13 -4.899015252965
14 14 95.922926485793
14 15 9.392565717943
15 4 1.086566676755
15 5 -10.433248264606
15 6 0.0
15 7 0.0
15 8 0.0
15 9 0.0
15 10 3.796447802343
15 11 -36.516589424683
15 12 4.910240264426
15 13 -46.928241846594
15 14 -9.793254743524
15 15 95.855239537521
```

In the above values, the first column is the row number of the Jacobian, the second column is the column number of the Jacobian, and the third column is the value of the Jacobian element. Any element that is not given in the file has a value of 0.

For the test system, since the minimum loss objective is used, the RSIs have the same values as the Lagrange Multipliers. In the final results the bus 5 has a negative P RSI and hence the generator at that bus negatively affects the system losses. The losses will go down if the P of the generator at bus 5 is reduced. Reducing load at bus 7 will have most benefits to system losses, since it has the highest P RSI. Therefore, this is the best bus for load shedding (curtailment). This is also the best location for adding a new generator. In a DER scenario, this bus is also the best location to add new DR or DG resources. Bux 2 is the best location for adding new VAr resources. Bux 2 is also more likely to have voltage collapse problems.

Note that any of the functions described herein may be implemented in hardware, software, and/or firmware, and/or any combination thereof. When implemented in software, the elements of the present invention are essentially the code segments to perform the necessary tasks. The program or code segments can be stored in a processor readable medium or transmitted by a computer data signal embodied in a carrier wave, or a signal modulated by a carrier, over a transmission medium. The "processor readable medium" may include any medium that can store or transfer information. Examples of the processor readable medium include an electronic circuit, a semiconductor memory device, a ROM, a flash memory, an erasable ROM (EROM), a floppy diskette, a compact disk CD-ROM, an optical disk, a hard disk, a fiber optic medium, a radio frequency (RF) link, etc. The computer data signal may include any signal that can propagate over a transmission medium such as electronic network channels, optical fibers, air, electromagnetic, RF links, etc. The code segments may be downloaded via computer networks such as the Internet, Intranet, etc.

Figure 9:
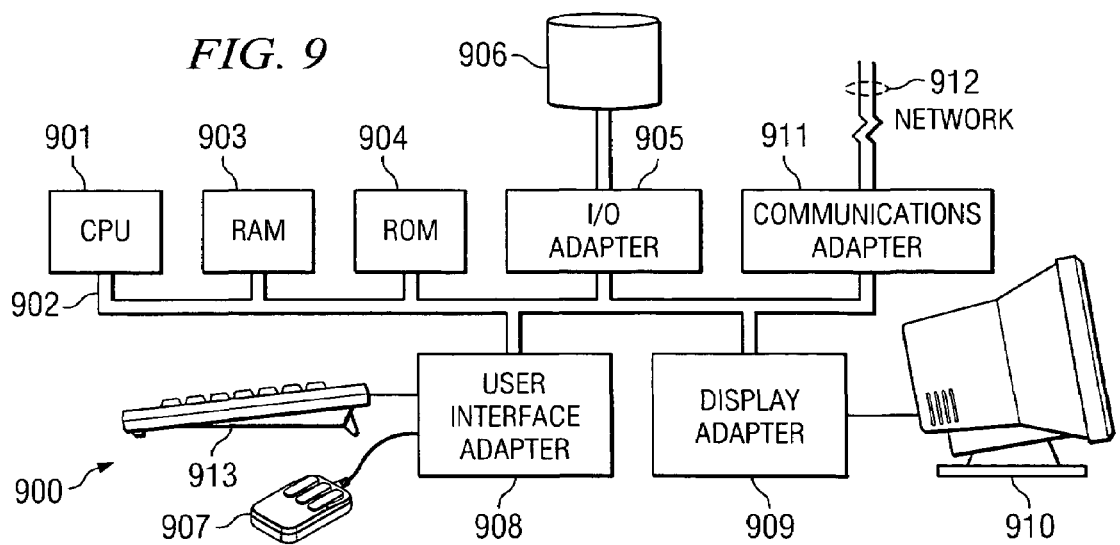
FIG. 9 depicts a block diagram of a computer system which is adapted to use the present invention.

FIG. 9 illustrates computer system 900 adapted to use the present invention. Central processing unit (CPU) 901 is coupled to system bus 902. The CPU 901 may be any general purpose CPU, such as an HP PA-8500 or Intel Pentium processor. However, the present invention is not restricted by the architecture of CPU 901 as long as CPU 901 supports the inventive operations as described herein. Bus 902 is coupled to random access memory (RAM) 903, which may be SRAM, DRAM, or SDRAM. ROM 904 is also coupled to bus 902, which may be PROM, EPROM, or EEPROM. RAM 903 and ROM 904 hold user and system data and programs as is well known in the art.

Bus 902 is also coupled to input/output (I/O) controller card 905, communications adapter card 911, user interface card 908, and display card 909. The I/O adapter card 905 connects to storage devices 906, such as one or more of a hard drive, a CD drive, a floppy disk drive, a tape drive, to the computer system. The I/O adapter 905 is also connected to printer 914, which would allow the system to print paper copies of information such as document, photographs, articles, etc. Note that the printer may a printer (e.g. dot matrix, laser, etc.), a fax machine, or a copier machine. Communications card 911 is adapted to couple the computer system 900 to a network 912, which may be one or more of a telephone network, a local (LAN) and/or a wide-area (WAN) network, an Ethernet network, and/or the Internet network. User interface card 908 couples user input devices, such as keyboard 913, pointing device 907, and microphone 916, to the computer system 900. User interface card 908 also provides sound output to a user via speaker(s) 915. The display card 909 is driven by CPU 901 to control the display on display device 910.

Although the present invention and its advantages have been described in detail, it should be understood that various changes, substitutions and alterations can be made herein without departing from the invention as defined by the appended claims. Moreover, the scope of the present application is not intended to be limited to the particular embodiments of the process, machine, manufacture, composition of matter, means, methods and steps described in the specification. As one will readily appreciate from the disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A system for controlling system resources comprising:
    a CPU-based computer system including code stored on a processor-readable storage medium, said CPU-based computer system performing the following functions:
    a. providing system parameters;
    b. non-linear calculation of at least two sets of indexes based on the system parameters, including optimization of resource allocation using a Lagrange function, L, wherein L is given as:

$$L(X, \lambda, \mu, \rho, \sigma) = f(X) + \sum_i \lambda_i u_i(X) \sum_{j \in T} \mu_j v_j(X) + \sum_{k \in S} \rho_k (x_k - \bar{x}_k) + \frac{1}{2} \sum_{k \in S} \sigma_k (x_k - \bar{x}_k)^2$$

where
    $X=[x_1, x_2, \ldots, x_{N_x}]$ is the set of primal system variables such that $x_{min,k} \leq x_k \leq x_{max,k}$, for $k=1, \ldots, N_x$;
    $f(X)$ is the objective function;
    $u(X)$ is a set of equality constraints;
    $v(X)$ is a set of inequality constraints;
    $\lambda$ is the vector of multipliers for equality constraints;
    $\mu$ is the vector of multipliers for inequality constraints;
    $\rho$ is the vector of multipliers for violated variable limits;
    $\sigma$ is the vector of penalties for the violated limits;
    $\bar{x}$ is the violated limit of variable x;
    T is the set of unsatisfied inequality constraints; and
    S is the set of violated limits; and
    c. controlling at least one system resource based on the at least two sets of indexes, wherein the controlling at least one system resource comprises load shedding.

2. The system of claim 1 wherein the system parameters comprise at least one of: objectives, resources, components, and constraints.

3. The system of claim 2 wherein the constraints comprise hard constraints and soft constraints, and wherein the soft constraints can be violated.

4. The system of claim 3 wherein violation of the soft constraints imposes a penalty.

5. The system of claim 1 wherein the at least two sets of indexes comprises a first set of indexes and a second set of indexes, wherein the second set of indexes gives the sensitivities of the first set of indexes to changes in system parameters.

6. The system of claim 1 wherein the non-linear calculation is a modified Lagrangian Relaxation method.

7. The system of claim 6 wherein a modification to the Lagrangian Relaxation method comprises decoupling the optimization with respect to the primal variables.

8. The system of claim 6 wherein a modification to the Lagrangian Relaxation method comprises predicting the multiplier of a constraint.

9. The system of claim 1 wherein the optimization is defined as:

$$\underset{(\lambda, \mu, \rho)}{\text{maximize}} \left[ \underset{(X)}{\text{minimize}} L(X, \lambda, \mu, \rho, \sigma) \right].$$

10. The system of claim 9 wherein the optimization is operative to:
    a. relax all the constraints by setting all multipliers and penalties to 0;
    b. minimize the Lagrange function with respect to X;
    c. test whether all the constraints are satisfied; if satisfied and stationary point conditions are met, then stop otherwise, proceed to d;
    d. update $\lambda$, $\mu$ and $\rho$ so that the new value of the Lagrange function is maximized, and return to b.

11. The system of claim 1 wherein the optimization in b is decoupled with respect to the primal variables.

12. The system of claim 1 wherein multipliers are predicted using a sensitivity analysis.

13. A system for controlling a non-linear network, said system comprising:
    one or more CPU-based devices including code stored on a processor readable storage medium, performing the following functions:
    a. receiving data indicating network resources, network components, objectives for managing the non-linear network, and constraints of the non-linear network;
    b. using at least a subset of said received data, computing:
        i. a first index indicating a sensitivity of a given objective function with respect to changes in said network resources; and
        ii. a second index indicating a sensitivity of said first index with respect to the changes in said network resources;
    c. managing the non-linear network based, at least in part, on said first and second indexes, wherein the first index provides congestion levels in the non-linear network.

14. The system of claim 13 wherein said non-linear network comprises a power transmission and distribution network.

15. The system of claim 13 wherein the constraints comprise hard constraints and soft constraints, and wherein the soft constraints can be violated.

16. The system of claim 15 wherein violation of the soft constraints imposes a penalty.

17. The system of claim 13 wherein managing the non-linear network comprises load shedding.

18. The system of claim 13 wherein said data indicating network resources and network components comprises data representing nodes in a power transmission network, and wherein said first index indicates scarcity or surplus of said network resources at each node in the power transmission network, and wherein said second index indicates changes in said first index due to said changes in said network resources.

19. The system of claim 13 where the first index provides resource surplus or deficiency in the non-linear network.

20. The system of claim 19 where the first and second indexes are used to place transmission lines in the non-linear network.

21. The system of claim 19 where the first and second indexes implement incentives for market participants.

22. The system of claim 13 where the first index provides Locational Marginal Prices (LMP).

23. The system of claim 13 where the system is used for financial optimization of the non-linear network, the non-linear network comprising a utility transmission system.

24. The system of claim 13 where the first index is used to rank system resources.

25. The system of claim 24 where the system resources comprise one or more of: generators, loads, static VAr devices, transformers, and synchronous condensers.

26. The system of claim 13 where the first and second indexes are used to determine optimal system upgrades.

27. The system of 13 where the first and second indexes are used for determining a unit commitment solution.

28. The system of claim 27 where objectives of the unit commitment solution comprise one or more of minimum cost and minimum green house gas emission.

29. The system of claim 13 where the first and second indexes are used for controlling data transfer in a data network.

30. The system of claim 13 where the first and second indexes are used for controlling fluid flows in a fluid flow network.

31. The system of claim 13 where the first and second indexes are used for controlling traffic flow in a transportation network.

32. The system of claim 13 where the first and second indexes are used for controlling passenger flow in a mass transit network.

33. The system of claim 13 where the first and second indexes are used for controlling airplane flows in an air traffic network.

34. The system of claim 13 where the first and second indexes are used to add, remove and control distributed energy resources (DER) in the network.

35. The system of claim 34 where the distributed energy resources comprise one or more of demand response and distributed generation.

36. The system of claim 13 where the first index provides stress levels in the non-linear network.

37. The system of claim 36 where the first index is used as an indicator of voltage stability in the non-linear network.

38. The system of claim 36 where the first and second indexes are used in determining optimal amount of load shedding in the system.

39. The system of claim 36 where first and second indexes are used to add, remove or control resources at a given location in the non-linear network.

40. The system of claim 39 where the first and second indexes are used to add, remove, or control generators in the non-linear network, the non-linear network comprising an electricity transmission network.

41. The system of claim 39 where the first and second indexes are used to control transformers in the non-linear network.

42. The system of claim 39 where the first and second indexes are used to add, remove or control reactive power devices in the non-linear network, the non-linear network comprising an electricity transmission network.

43. The system of claim 42 where the reactive power devices comprise static VAr devices.

* * * * *